(12) United States Patent
Jackson et al.

(10) Patent No.: US 11,410,518 B2
(45) Date of Patent: Aug. 9, 2022

(54) CROSS-REALITY SAFETY SERVICE

(71) Applicant: AT&T Intellectual Property I, L.P., Atlanta, GA (US)

(72) Inventors: James Jackson, Austin, TX (US); Eric Zavesky, Austin, TX (US); James Pratt, Round Rock, TX (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 52 days.

(21) Appl. No.: 16/914,641

(22) Filed: Jun. 29, 2020

(65) Prior Publication Data
US 2021/0407272 A1    Dec. 30, 2021

(51) Int. Cl.
*G08B 21/02* (2006.01)
*G08B 5/22* (2006.01)

(52) U.S. Cl.
CPC .............. *G08B 21/02* (2013.01); *G08B 5/22* (2013.01)

(58) Field of Classification Search
CPC .......... G08B 21/02; G08B 5/22; G06T 19/006
See application file for complete search history.

(56) References Cited

U.S. PATENT DOCUMENTS

| | | | |
|---|---|---|---|
| 10,242,476 B2* | 3/2019 | Bastaldo-Tsampalis | G06T 19/006 |
| 10,482,677 B1* | 11/2019 | Iyer | G06K 9/3241 |
| 10,740,918 B2* | 8/2020 | Iyer | G06T 7/70 |
| 10,816,341 B2* | 10/2020 | Iyer | G02B 27/0093 |
| 10,817,050 B2* | 10/2020 | Iyer | G06T 19/006 |
| 10,852,819 B2* | 12/2020 | Iyer | H04N 5/247 |
| 2017/0039045 A1* | 2/2017 | Abrahami | A61B 5/486 |
| 2017/0192620 A1* | 7/2017 | Kim | G06F 3/0481 |
| 2018/0219950 A1* | 8/2018 | Hodge | H04W 12/065 |
| 2018/0357865 A1* | 12/2018 | Saidi | G08B 7/066 |
| 2020/0059502 A1* | 2/2020 | Iyer | H04B 17/318 |
| 2020/0065584 A1* | 2/2020 | Iyer | G06T 7/70 |
| 2020/0326699 A1* | 10/2020 | Bastian, II | G05D 1/0214 |

* cited by examiner

*Primary Examiner* — Curtis J King
(74) *Attorney, Agent, or Firm* — Hartman & Citrin LLC

(57) ABSTRACT

Concepts and technologies are disclosed herein for a cross-reality safety service. A device can detect a cross-reality session associated with a user device. The cross-reality session can include a rendered environment and the user device can be located in a physical environment. Data associated with the cross-reality session can be obtained. It can be determined if a safety issue exists for the cross-reality session. If the safety issue is determined to exist for the cross-reality session, a communication can be directed to the user device, where the communication can include an update to the rendered environment, a command to end the cross-reality session, or an alert.

20 Claims, 10 Drawing Sheets

CROSS-REALITY SAFETY SERVICE

BACKGROUND

The phrase "cross-reality," also referred to as "X Reality" or "XR," can be used to refer to a mixed reality environment that can result from a combination of real world elements with one or more virtual world elements. Cross-reality environments can be created in some cases by various combinations of hardware and software, which collectively can provide a "new reality" using software-generated visual and/or audio elements (also known as virtual reality), optionally in combination with one or more sensory interfaces. The sensory interfaces can enable cross-reality environments to surpass virtual reality and/or augmented reality environments, in terms of immersion, by providing sensory inputs to users beyond sight and sound (e.g., by providing haptic feedback, texture emulations, combinations thereof, or the like). Because of the immersive nature of virtual reality technologies in general, and cross-reality technologies in particular, users engaged in cross-reality sessions sometimes can feel immersed in the virtual environment and attention to the real world may be reduced.

As various cross-reality technologies continue to advance and develop, new opportunities and/or applications of cross-reality may be created and may be put into use. With the proliferation of cross-reality applications and the associated sense of immersion that users often feel, new challenges may also arise. In particular, it is possible that dangerous situations and fraud may be introduced to some cross-reality experiences. Additionally, as the use of cross-reality equipment (e.g., cross-reality headsets, sensory interfaces, etc.) become more commonplace, users may become more comfortable with their use and therefore may increase their reliance and/or attention on virtual world elements and decrease their reliance and/or attention on real world elements.

SUMMARY

The present disclosure is directed to a cross-reality safety service. Cross-reality systems and/or technologies that aim to fully immerse the user may be desirable to some users, but the seemingly-ever-increasing level of immersion and realism may cause a correspondingly increasing lack of connection to real world conditions around a user of cross-reality equipment and/or software. Thus, for example, a user involved in a cross-reality session or experience may lack awareness of potential dangers (e.g., roads, walls, cars, etc.) in his physical environment and/or vicinity. Furthermore, in some virtual spaces, some experiences may be portrayed so realistically that such experiences may exceed some users' emotional comfort levels and/or familiarity, thereby posing emotional threats or risks to the users. Failure to satisfy the users' comfort levels and/or familiarity can result in unpleasant experiences and/or may ruin the users' overall experiences during cross-reality sessions. Still further, some cross-reality environments may mask physical threats to the user.

Such threats may be masked intentionally (e.g., as a result of fraud, a hack or other compromise, etc.), or unintentionally (e.g., as a result of an error in texture mapping, or the like). Such scenarios may pose a physical risk to the user and therefore also could result in physical harm and/or ruining the overall experience during the cross-reality session. These threats can be particularly pronounced due to the goal of complete immersion and/or complete lack of attention, as can be experienced by users involved in some cross-reality sessions. Some embodiments of the cross-reality safety service illustrated and described herein can be configured to identify and/or mitigate some risks such as these, as well as providing mechanisms (e.g., safe words, safe phrases, gestures, and the like) that can be invoked by users at any time to "escape" the cross-reality session, for example, by immediately terminating the cross-reality session when certain risks and/or when safe phrases or other mechanisms are detected.

A user of a device, for example as a user device, can request a cross-reality session. In some embodiments, the user device can execute a cross-reality application that can create a request for the cross-reality session and can send the request to a cross-reality service. The cross-reality service can generate cross-reality environment data for creating an environment associated with the requested cross-reality session. The cross-reality service can send the cross-reality environment data to the user device for rendering. In some embodiments, the cross-reality application at the user device can generate the rendered environment based on the cross-reality environment data. According to various embodiments of the concepts and technologies disclosed herein, cross-reality equipment used by the user can include various sensors for monitoring the user and/or the physical environment of the user.

A cross-reality safety service can be hosted and/or executed by a server computer. The cross-reality safety service can detect the cross-reality session at or associated with the user device. In some embodiments, the cross-reality safety service can detect the cross-reality session based on communications with one or more of the user device and/or the cross-reality service. For example, in some embodiments, the functionality of the cross-reality safety service can be requested or invoked by one or more requests, service calls, and/or receiving data from one or more devices. In some embodiments, for example, the cross-reality service can provide the cross-reality environment data to the cross-reality safety service in addition to the user device, whereby the cross-reality safety service can detect the cross-reality session. In some embodiments, the cross-reality service can provide request data that can define the cross-reality environment requested by the user device, whereby the cross-reality safety service can detect the cross-reality session. Because the cross-reality safety service can detect the cross-reality session in additional and/or alternative manners, it should be understood that these examples are illustrative, and therefore should not be construed as being limiting in any way.

The cross-reality safety service can obtain data from one or more of the user device, the cross-reality service, and/or other local and/or remote devices. The cross-reality safety service can obtain the cross-reality environment data, cross-reality rendered environment data, the sensor data, the request data, and/or the profile. The cross-reality environment data can define the environment to be generated in association with the cross-reality session. The cross-reality rendered environment data can define the rendered environment that has been generated by the user device. The sensor data can include readings and/or other output obtained from the sensors. The request data can define the requested cross-reality session. The profile can define preferences, settings, and/or thresholds associated with the user.

The cross-reality safety service can analyze the data and determine, based on the analysis, if a safety issue exists in the cross-reality session. If the cross-reality safety service determines that a safety issue exists in the cross-reality session, the cross-reality safety service can generate one or more updates and/or alerts. The updates can be used to update the rendered environment, to terminate the cross-reality session, and/or to take other actions. The alerts can notify the user and/or other entities about the safety issue. Remedial action can be taken to address the safety issue.

According to one aspect of the concepts and technologies disclosed herein, a system is disclosed. The system can include a processor and a memory. The memory can store computer-executable instructions that, when executed by the processor, cause the processor to perform operations. The operations can include detecting a cross-reality session associated with a user device. The cross-reality session can include a rendered environment, and the user device can be located in a physical environment. In some embodiments, the operations further can include obtaining data associated with the cross-reality session; determining if a safety issue exists for the cross-reality session; and in response to determining that the safety issue exists for the cross-reality session, sending, directed to the user device, a communication. The communication can include one or more of an update that, when received by the user device, causes the user device to update the rendered environment associated with the cross-reality session, a command to end the cross-reality session, or an alert indicating that the safety issue exists for the cross-reality session.

In some embodiments, the data can include cross-reality rendered environment data that can represent the rendered environment. The data also can include sensor data that can be obtained from a sensor in communication with the user device. The sensor data can represent a condition in the physical environment, and determining that the safety issue exists can include analyzing the sensor data to identify the condition in the physical environment and determining that the condition poses a risk to a user engaged in the cross-reality session. In some embodiments, the risk can include one of a mismatch between a virtual texture associated with a rendered object in the rendered environment and real texture associated with a real object in the physical environment; or an obstacle in the physical environment that is unnoticeable due to attention being diverted to the rendered environment.

In some embodiments, the operations further can include determining if the data corresponds to a safe phrase. In response to determining that the data corresponds to the safe phrase, the command to end the cross-reality session can be sent to the user device. In some embodiments, the data can include sensor data and can be obtained from a sensor in communication with the user device. The sensor data can represent a condition in the physical environment, and determining that the data corresponds to the safe phrase can include recognizing, by analyzing the sensor data, the safe phrase in audio included in the sensor data. In some embodiments, the data can include cross-reality rendered environment data that can represent the rendered environment. The data further can include request data that can define a requested cross-reality session. The safety issue can include a mismatch between the rendered environment and the requested cross-reality session. In some embodiments, the mismatch can correspond to an insertion of an unexpected experience in the rendered environment.

According to yet another aspect, a method is disclosed. The method can include detecting a cross-reality session associated with a user device. The cross-reality session can include a rendered environment, and the user device can be located in a physical environment. In some embodiments, the operations further can include obtaining data associated with the cross-reality session; determining if a safety issue exists for the cross-reality session; and in response to determining that the safety issue exists for the cross-reality session, sending, directed to the user device, a communication. The communication can include one or more of an update that, when received by the user device, causes the user device to update the rendered environment associated with the cross-reality session, the command to end the cross-reality session, or an alert indicating that the safety issue exists for the cross-reality session.

In some embodiments, the data can include cross-reality rendered environment data that can represent the rendered environment. The data further can include sensor data and can be obtained from a sensor in communication with the user device. The sensor data can represent a condition in the physical environment. In some embodiments, determining that the safety issue exists can include analyzing the sensor data to identify the condition in the physical environment; and determining that the condition poses a risk to a user engaged in the cross-reality session.

In some embodiments, the risk can include a mismatch between a virtual texture associated with a rendered object in the rendered environment and real texture associated with a real object in the physical environment. In some embodiments, the risk can include an obstacle in the physical environment that is unnoticeable due to attention being diverted to the rendered environment. In some embodiments, the data can include sensor data and can be obtained from a sensor in communication with the user device. The sensor data can represent a condition in the physical environment. In some embodiments, the method further can include determining if the data corresponds to a safe phrase. In response to determining that the data corresponds to the safe phrase, the command to end the cross-reality session can be sent to the user device. Determining that the data corresponds to the safe phrase can include recognizing, by analyzing the sensor data, the safe phrase in audio included in the sensor data.

In some embodiments, the data can include cross-reality rendered environment data that can represent the rendered environment. The data further can include request data that can define a requested cross-reality session. In some embodiments, the safety issue can include a mismatch between the rendered environment and the requested cross-reality session. The mismatch corresponds to an insertion of an unexpected experience in the rendered environment. In some embodiments, the request data can be obtained from a cross-reality service that generates cross-reality environment data that can be provided, by the cross-reality service, to the user device to render the rendered environment. In some embodiments, the data can include a profile associated with the user device. The profile can define a threshold associated with the user device.

According to another aspect of the concepts and technologies disclosed herein, a computer storage medium is disclosed. The computer storage medium can store computer-executable instructions that, when executed by a processor, cause the processor to perform operations. The operations can include detecting a cross-reality session associated with a user device. The cross-reality session can include a rendered environment, and the user device can be located in a physical environment. In some embodiments, the operations further can include obtaining data associated with the cross-reality session; determining if a safety issue exists for the cross-reality session; and in response to determining that the safety issue exists for the cross-reality session, sending, directed to the user device, a communication. The communication can include one or more of an update that, when received by the user device, causes the user device to update the rendered environment associated with the cross-reality session, the command to end the cross-reality session, or an alert indicating that the safety issue exists for the cross-reality session.

In some embodiments, the data can include cross-reality rendered environment data that can represent the rendered environment. The data further can include sensor data and can be obtained from a sensor in communication with the user device. The sensor data can represent a condition in the physical environment. In some embodiments, the operations further can include determining if the data corresponds to a safe phrase. In response to determining that the data corresponds to the safe phrase, the command to end the cross-reality session can be sent to the user device. In some embodiments, the data can include cross-reality rendered environment data that can represent the rendered environment. The data further can include sensor data and can be obtained from a sensor in communication with the user device. The sensor data can represent a condition in the physical environment, and determining that the data corresponds to the safe phrase can include analyzing the sensor data to identify the condition in the physical environment; and determining that the condition poses a risk to a user engaged in the cross-reality session.

In some embodiments, the data can include sensor data and can be obtained from a sensor in communication with the user device. The sensor data can represent a condition in the physical environment, and determining that the safety issue exists can include recognizing, by analyzing the sensor data, the safe phrase in audio included in the sensor data. In some embodiments, the data can include cross-reality rendered environment data that can represent the rendered environment. The data further can include request data that can define a requested cross-reality session. The safety issue can include a mismatch between the rendered environment and the requested cross-reality session, and the mismatch can correspond to an insertion of an unexpected experience in the rendered environment.

Other systems, methods, and/or computer program products according to embodiments will be or become apparent to one with skill in the art upon review of the following drawings and detailed description. It is intended that all such additional systems, methods, and/or computer program products be included within this description and be within the scope of this disclosure.

DETAILED DESCRIPTION

Figure 1:
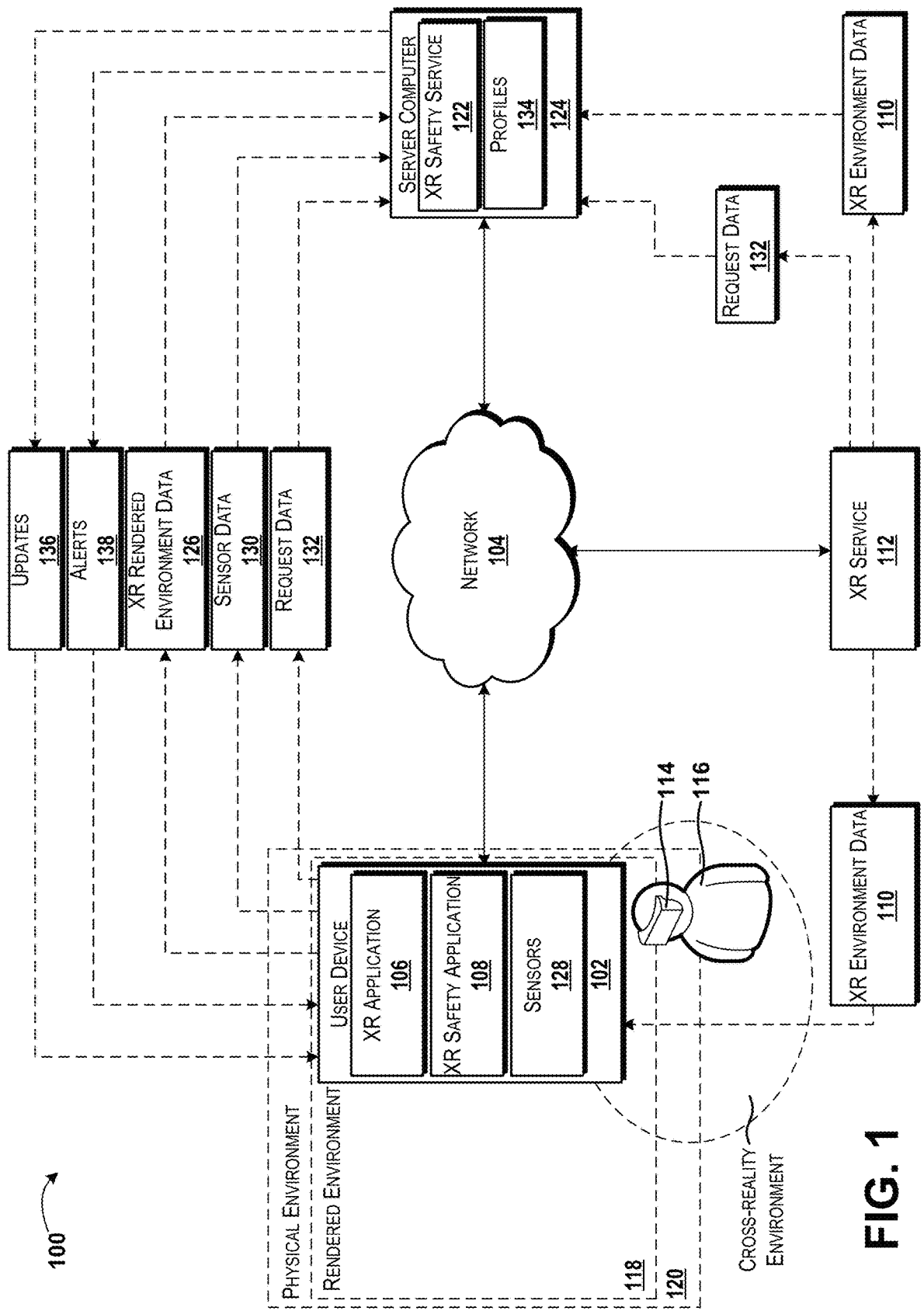
FIG. 1 is a system diagram illustrating an illustrative operating environment for various embodiments of the concepts and technologies described herein.

The following detailed description is directed to a cross-reality safety service. A user of a device such as a user device can request a cross-reality session. In some embodiments, the user device can execute a cross-reality application that can create a request for the cross-reality session and can send the request to a cross-reality service. The cross-reality service can generate cross-reality environment data for creating an environment associated with the requested cross-reality session. The cross-reality service can send the cross-reality environment data to the user device for rendering. In some embodiments, the cross-reality application at the user device can generate the rendered environment based on the cross-reality environment data. According to various embodiments of the concepts and technologies disclosed herein, cross-reality equipment used by the user can include various sensors for monitoring the user and/or the physical environment of the user.

A cross-reality safety service can be hosted and/or executed by a server computer. The cross-reality safety service can detect the cross-reality session at or associated with the user device. In some embodiments, the cross-reality safety service can detect the cross-reality session based on communications with one or more of the user device and/or the cross-reality service. For example, in some embodiments, the functionality of the cross-reality safety service can be requested or invoked by one or more requests, service calls, and/or receiving data from one or more devices. In some embodiments, for example, the cross-reality service can provide the cross-reality environment data to the cross-reality safety service in addition to the user device, whereby the cross-reality safety service can detect the cross-reality session. In some embodiments, the cross-reality service can provide request data that can define the cross-reality environment requested by the user device, whereby the cross-reality safety service can detect the cross-reality session. Because the cross-reality safety service can detect the cross-reality session in additional and/or alternative manners, it should be understood that these examples are illustrative, and therefore should not be construed as being limiting in any way.

The cross-reality safety service can obtain data from one or more entity such as, for example, the user device, the cross-reality service, and/or other local and/or remote devices. The cross-reality safety service can obtain the cross-reality environment data, cross-reality rendered environment data, the sensor data, the request data, and/or the profile. The cross-reality environment data can define the environment to be generated in association with the cross-reality session. The cross-reality rendered environment data can define the rendered environment that has been generated by the user device. The sensor data can include readings and/or other output obtained from the sensors. The request data can define the requested cross-reality session. The profile can define preferences, settings, and/or thresholds associated with the user.

The cross-reality safety service can analyze the data and determine, based on the analysis, if a safety issue exists in the cross-reality session. If the cross-reality safety service determines that a safety issue exists in the cross-reality session, the cross-reality safety service can generate one or more updates and/or alerts. The updates can be used to update the rendered environment, to terminate the cross-reality session, and/or to take other actions. The alerts can notify the user and/or other entities about the safety issue. Remedial action can be taken to address the safety issue.

While the subject matter described herein is presented in the general context of program modules that execute in conjunction with the execution of an operating system and application programs on a computer system, those skilled in the art will recognize that other implementations may be performed in combination with other types of program modules. Generally, program modules include routines, programs, components, data structures, and other types of structures that perform particular tasks or implement particular abstract data types. Moreover, those skilled in the art will appreciate that the subject matter described herein may be practiced with other computer system configurations, including hand-held devices, multiprocessor systems, microprocessor-based or programmable consumer electronics, minicomputers, mainframe computers, and the like.

As used herein, the phrase "cross-reality," when used in association with an application, service, equipment, session, and/or environment, can be used to refer to multiple types of virtual reality technologies that include the generation of at least one virtual visual element (e.g., a computer-generated object that can be depicted in imagery (e.g., an image or a video)). In some embodiments, cross-reality sessions can include partial or completely virtual imagery and partial or completely virtual audio. In some other embodiments, cross-reality sessions can include partial or completely virtual imagery, partial or completely virtual audio, and sensory input (e.g., via sensory interfaces). In yet other embodiments, a cross-reality session can include completely virtual (computer-generated) imagery, completely virtual (computer-generated) audio, and sensory input (e.g., via sensory interfaces). Thus, it should be understood that a cross-reality session as recited in the claims includes at least one virtual visual element that is presented to a user via a visual interface such as a display (e.g., on a computer, smartphone, virtual reality glasses, virtual reality headsets, combinations thereof, or the like).

Referring now to FIG. 1, aspects of an operating environment 100 for various embodiments of the concepts and technologies disclosed herein for a cross-reality safety service will be described, according to an illustrative embodiment. The operating environment 100 shown in FIG. 1 includes a user device 102. According to some embodiments, the user device 102 can operate in communication with and/or as a part of a communications network ("network") 104, though this is not necessarily the case in all embodiments.

According to various embodiments, the functionality of the user device 102 may be provided by one or more server computers, desktop computers, mobile telephones, laptop computers, cross-reality devices, set-top boxes, other computing systems, and the like. It should be understood that the functionality of the user device 102 can be provided by a single device, by two or more similar devices, and/or by two or more dissimilar devices. For purposes of describing the concepts and technologies disclosed herein, the user device 102 is described herein as a mobile phone or smartphone. It should be understood that this embodiment is illustrative, and should not be construed as being limiting in any way.

The user device 102 can execute an operating system (not labeled in FIG. 1) and one or more application programs such as, for example, a cross-reality application 106 (labeled "XR application" in FIG. 1) and a cross-reality safety application 108 (labeled "XR safety application" in FIG. 1). The operating system can include a computer program that can be executed to control the operation of the user device 102. The cross-reality application 106 and the cross-reality safety application 108 can include executable programs that can be configured to execute on top of the operating system to provide various functions as illustrated and described herein.

In particular, the cross-reality application 106 can be configured to obtain and/or to generate cross-reality environment data 110 (labeled "XR environment data" in FIG. 1). According to various embodiments, including the illustrated embodiment, the cross-reality application 106 can obtain the cross-reality environment data 110 from a cross-reality service 112 (labeled "XR service" in FIG. 1). The cross-reality environment data 110 can be used to create a cross-reality view or environment, as will be explained in more detail below. Because the cross-reality environment data 110 can be obtained from additional and/or alternative sources, it should be understood that this example is illustrative, and therefore should not be construed as being limiting in any way.

According to various embodiments of the concepts and technologies disclosed herein, the cross-reality application 106 can obtain the cross-reality environment data 110 and render a cross-reality view or environment that can be output to a user 116, for example on a display and/or other hardware component(s) of a cross-reality headset and/or other equipment (collectively referred to herein as "cross-reality equipment") 114. According to various embodiments of the concepts and technologies disclosed herein, the cross-reality equipment 114 can include, but is not limited to, one or more display devices (e.g., a virtual reality or augmented reality headset, a stereoscopic display system, projection screen systems, etc.), one or more sensory interfaces (e.g., haptic feedback devices, treadmills, step machines, stationary bikes, etc.), one or more motion capture cameras, one or more sound systems (microphones speakers, etc.), one or more lighting devices, and the like. Although FIG. 1 only explicitly illustrates a virtual reality headset, it should be understood that this illustration is merely representative of various types of cross-reality equipment 114, such as the various examples listed above, and other known and/or contemplated cross-reality equipment. Because the functionality and operation of cross-reality equipment 114, such as the examples listed above, generally are understood, it should be understood that the illustrated example is illustrative, and therefore should not be construed as being limiting in any way.

According to various embodiments of the concepts and technologies disclosed herein, the cross-reality application 106 can obtain the cross-reality environment data 110 and create a rendered environment 118 based on the cross-reality environment data 110. It can be appreciated that the rendered environment 118 can include a virtual environment, an augmented reality environment, a virtual reality environment, other environments, and/or combinations thereof. Thus, it should be appreciated that the cross-reality environment data 110 received by the user device 102 can define various contours of the rendered environment 118 such as, for example, definitions of materials, definitions of surfaces and/or structures in the rendered environment 118, audio to be associated with the rendered environment 118, characters and/or objects to be created or represented in the rendered environment 118, story lines associated with the rendered environment 118, and/or other aspects of the rendered environment 118 that is to be created by the cross-reality application 106, in some embodiments; or renderable data that, when rendered by the cross-reality application 106, can correspond to the rendered environment 118.

As is generally understood, the user device 102 and the user 116 can be located in a physical environment 120, and the rendered environment 118 can effectively be located within the physical environment 120, though the rendered environment 118 may not have any actual "location" per se. Thus, it can be appreciated that the rendered environment 118 can include, in some embodiments, a blend of virtual and/or other rendered objects and/or surfaces, as well as photographs and/or live video of the physical environment 120. Thus, as shown in FIG. 1, a cross-reality environment or cross-reality session can include one or more virtual elements or objects depicted in the rendered environment 118, optionally blended with one or more real objects in the real world (e.g., in the physical environment 120), optionally blended with one or more real and/or virtual sounds, optionally blended with one or more other sensory inputs (e.g., via a real world object and/or via sensory interfaces). Thus, the cross-reality environment can correspond to an intersection between the rendered environment 118 and the physical environment 120 and/or other elements or inputs. Because of the immersive experience of cross-reality, the user 116 involved in a cross-reality session may feel and/or think that he or she is located within the rendered environment 118, as is generally understood.

According to various embodiments of the concepts and technologies disclosed herein, the cross-reality application 106 can interact with a cross-reality safety application 108. It should be understood, however, that in some other embodiments, the cross-reality safety application 108 can be included as a module and/or other programmatic component of the cross-reality application 106 that is executed by the user device 102, or that the cross-reality safety application 108 can be executed by another device or devices. Thus, it should be understood that the cross-reality safety application 108 and the cross-reality application 106 may be embodied as or in stand-alone devices or components thereof operating as part of or in communication with the network 104 and/or the user device 102. As such, the illustrated embodiment should be understood as being illustrative of only some contemplated embodiments and should not be construed as being limiting in any way.

The cross-reality safety application 108 can be configured to obtain information relating to the rendered environment 118, the physical environment 120, and/or the user 116 to enhance the safety of the user 116 during the cross-reality session. In various embodiments, the cross-reality safety application 108 can interact with a cross-reality safety service 122 (labeled "XR safety service" in FIG. 1), which can be hosted and/or executed in some embodiments by a device such as, for example, a server computer 124, while in some other embodiments, the functionality illustrated and described herein with reference to the cross-reality safety service 122 can be provided by the cross-reality safety application 108. According to various embodiments, the cross-reality safety application 108 can interact with the cross-reality safety service 122 to monitor the rendered environment 118, the physical environment 120, and/or the user 116 to identify one or more security or safety threats as will be explained in additional detail herein.

In particular, the cross-reality safety application 108 can be configured to generate and/or capture one or more instances or streams of cross-reality rendered environment data 126 (labeled "XR rendered environment data" in FIG. 1) and to provide the cross-reality rendered environment data 126 to the cross-reality safety service 122. The cross-reality rendered environment data 126 can correspond to imagery (e.g., one or more views) associated with the rendered environment 118, representations of one or more objects in the rendered environment 118, representations of materials and/or surfaces in the rendered environment 118, compositions of objects in the rendered environment 118, and/or other information that is used to render and/or represent the cross-reality environment depicted in the rendered environment 118, such as audio information, sensory outputs, combinations thereof, or the like.

Thus, the cross-reality rendered environment data 126 can include data that depicts and/or represents the rendered environment 118, and therefore can depict/represent what the user 116 sees, feels, hears, and/or otherwise experiences during the cross-reality session (in association with the rendered environment 118 and/or the physical environment 120). The user device 102 can generate and/or capture the cross-reality rendered environment data 126 by monitoring the views and/or other experiences generated by the cross-reality application 106 and generating the cross-reality rendered environment data 126 based on the monitored views and/or experiences. Because the cross-reality rendered environment data 126 can be generated by other devices and/or applications, it should be understood that this example is illustrative, and therefore should not be construed as being limiting in any way.

According to various embodiments of the concepts and technologies disclosed herein, the user device 102 also can include, or can communicate with, one or more sensors 128. Although the sensors 128 are illustrated in FIG. 1 as being located at the user device 102, it should be understood that in various embodiments of the concepts and technologies disclosed herein, the sensors 128 can be included in and/or located at the cross-reality equipment 114, in or at other devices, and/or elsewhere. As such, the illustrated example is illustrative and should not be construed as being limiting in any way.

According to various embodiments of the concepts and technologies disclosed herein, the sensors 128 can be configured to capture various conditions in the physical environment 120. The conditions in the physical environment 120 can include, but are not limited to, for example, images and/or video of the physical environment 120 (e.g., an area in a proximity of the user 116, the user device 102, and/or the cross-reality equipment 114); images and/or video of the user 116; an ambient temperature in the physical environment 120 (e.g., in an area in a proximity of the user 116, the user device 102, and/or the cross-reality equipment 114); a temperature, respiration rate, pulse, oxygen level, or the like associated with the user 116; facial expressions and/or attention of the user 116; sounds in the physical environment 120 and/or sounds associated with the user 116 (e.g., speech, etc.); neurological activity associated with the user 116; movements of the user 116; combinations thereof; or the like. As such, the sensors 128 can include, but are not limited to, one or more microphones; cameras; heart rate monitors; pulse oximeters; electrodes (e.g., for use in electroencephalography ("EEG")), electromyographs (e.g., for use in electromyography ("EMG") or the like); accelerometers, gyroscopes, and/or other orientation or motion sensors; other devices; combinations thereof, or the like.

The sensors 128 can be configured to capture conditions at and/or in the vicinity and/or proximity of the user 116 and/or the cross-reality equipment 114, as well as conditions of the user 116. The user device 102 can communicate with the sensors 128 and can generate, based on output from the sensors 128, the sensor data 130. The sensor data 130 can correspond to a data file or data structure that can include one or more sensor readings and/or sensor outputs obtained from the sensors 128. As explained above, the user device 102 can communicate with one or more other devices that can include the sensors 128, and therefore, it should be understood that the user device 102 can receive the sensor data 130 from other devices, in some embodiments.

Regardless of where the sensors 128 are located, and based on the above description of the types of sensors 128 that can be included in various embodiments of the concepts and technologies disclosed herein, it can be appreciated that the sensor data 130 can include audio files (e.g., speech and/or other sounds generated by the user 116 and/or speakers of the cross-reality equipment 114, or the like); images and/or video (captured by one or more cameras); temperature information; pulse, respiration, oxygen saturation, neurological activity, attention information, and/or other information associated with the user 116; orientation, movement, and/or motion associated with the user 116 and/or the cross-reality equipment 114; combinations thereof; or the like.

In some embodiments, the user device 102 can provide the sensor data 130 to the cross-reality safety service 122. In some embodiments, the user device 102 also can provide the cross-reality rendered environment data 126 to the cross-reality safety service 122. According to various embodiments of the concepts and technologies disclosed herein, the user device 102 also can provide request data 132 to the cross-reality safety service 122. The request data 132 can include data that describes or reflects a cross-reality session that was requested by the user 116 or other entity that requested the cross-reality session from the cross-reality service 112. Thus, for example, the request data 132 can describe the type of environment requested (e.g., a beach, a forest, a city street, a building, a room, etc.), characters that were to be located in the environment (e.g., animals, people, birds, etc.), sounds that were to be located in the environment, sensory inputs associated with the environment (e.g., textures of objects, etc.), materials that were to be included in the environment (e.g., sand, rocks, water, grass, etc.), and/or other parameters that can be used by the cross-reality service 112 to generate the cross-reality environment data 110 that is used to create the rendered environment 118.

Based on the above description, it should be understood that in some embodiments the cross-reality rendered environment data 126, the sensor data 130, and the request data 132 can be captured by the cross-reality safety application 108, though this is not necessarily the case. In some other embodiments, the cross-reality rendered environment data 126, the sensor data 130, and/or the request data 132 can be provided to the cross-reality safety service 122 by the user device 102 and/or other devices. For example, in some embodiments the request data 132 can be provided to the cross-reality safety service 122 by the cross-reality service 112. Because additional and/or alternative devices and/or entities can provide these and other data to the cross-reality safety service 122, the illustrated embodiment shown in FIG. 1 should be understood as being illustrative of the concepts and technologies disclosed herein and should not be construed as being limiting in any way.

According to various embodiments of the concepts and technologies disclosed herein, the server computer 124 can obtain the cross-reality rendered environment data 126 and the sensor data 130. According to some embodiments of the concepts and technologies disclosed herein, the server computer 124 can receive or otherwise obtain (e.g., request) the cross-reality rendered environment data 126 and the sensor data 130 from the user device 102, while in some other embodiments the server computer 124 can receive or otherwise obtain the cross-reality rendered environment data 126 and the sensor data 130 from other devices, from databases, or the like. In some embodiments, the server computer 124 also can receive or otherwise obtain the cross-reality environment data 110 from the cross-reality service 112 and/or other devices or entities. It should be understood that this example is illustrative, and therefore should not be construed as being limiting in any way.

The cross-reality safety service 122 can be configured to analyze data associated with a cross-reality session to detect any safety issues associated with the cross-reality session. Thus, it can be appreciated that the cross-reality safety service 122 can monitor the cross-reality session for safety issues, in some embodiments. In particular, the cross-reality safety service 122 can be configured to interact with the user device 102 (or other device used in association with the cross-reality session) to determine if the cross-reality session includes any threats to safety of the user 116 and/or other entities in the physical environment 120, including whether the user 116 has used a safe word, safe phrase, or safe action, as is explained in more detail herein. In some embodiments, the cross-reality safety service 122 also can communicate with the cross-reality service 112 to obtain the cross-reality environment data 110. It should be understood that in some embodiments of the concepts and technologies disclosed herein, some functionality of the cross-reality safety service 122 can be incorporated into and/or provided by the cross-reality safety application 108. Thus, the illustrated embodiment is illustrative and should not be construed as being limiting in any way.

In some embodiments of the concepts and technologies disclosed herein, the cross-reality safety service 122 can obtain the request data 132, the cross-reality rendered environment data 126, and the sensor data 130 from the user device 102 (or other device used in association with the cross-reality session). The cross-reality safety service 122 can analyze the cross-reality rendered environment data 126 to identify one or more aspects of the rendered environment 118 (e.g., materials, objects, characters, movements, haptic feedback, textures, sounds, etc.). This determination can be used by the cross-reality safety service 122 to perform various operations to identify one or more safety issues associated with the rendered environment 118.

In some embodiments, for example, the cross-reality safety service 122 can determine if any aspects of the rendered environment 118 differ from the original intent of the user 116 and/or requested cross-reality environment. Thus, for example, the cross-reality safety service 122 can analyze the request data 132 to determine one or more aspects of the requested cross-reality environment (e.g., materials, objects, characters, movements, haptic feedback, textures, sounds, etc.) and determine, based on an analysis of the cross-reality rendered environment data 126, if the rendered environment 118 matches the requested cross-reality environment. It should be understood that in some embodiments, the cross-reality safety service 122 can make a similar determination without obtaining and/or analyzing the request data 132. As will be explained in more detail below, preferences, settings, thresholds, and/or the like can be determined for a user 116 (e.g., as stored in a profile 134) and used to determine if any expectations and/or thresholds have been exceeded by information included in the rendered environment 118. As such, it should be understood that the above example using the request data 132 is illustrative, and therefore should not be construed as being limiting in any way.

In some embodiments, the cross-reality safety service 122 can obtain the cross-reality environment data 110 (as noted above) and compare the environment represented by the cross-reality environment data 110 to the environment represented by the cross-reality rendered environment data 126 to determine if any changes have been made in the environment. Thus, for example, the cross-reality safety service 122 can determine whether or not the rendered environment 118 differs from the requested cross-reality environment in terms of visual features, audio features, textures, characters, and/or activities such that interactions of the user 116 with the rendered environment 118 are not consistent with the requested interactions. In such a case, the cross-reality safety service 122 can determine that there exists a compromised integrity of the virtual content and/or that one or more expectations of the user 116 has or have not been complied with. Because such a compromised integrity can be detected in additional and/or alternative manners, it should be understood that this example is illustrative, and therefore should not be construed as being limiting in any way.

In some embodiments, the cross-reality safety service 122 can determine if there are any aspects of the rendered environment 118 that present a potential safety issue to the user 116. For example, the cross-reality safety service 122 can determine, based on an analysis of the cross-reality rendered environment data 126 and/or the sensor data 130, if the rendered environment 118 includes any experience that exceeds a personal comfort or safety threshold of the user 116, which as noted above can be defined in a profile 134, in some embodiments. For example, a malicious or accidental insertion of some experience in the rendered environment 118 can upset the user 116 and therefore the detection of such experiences can be provided by the cross-reality safety service 122 to protect the user 116 from such experiences. It should be understood that this example is illustrative, and therefore should not be construed as being limiting in any way.

It can be appreciated that if there exists any mismatch between the requested cross-reality session and the rendered environment 118, the cross-reality safety service 122 can determine that an unexpected experience (e.g., unexpected scene, unexpected character, unexpected audio, etc.) has been inserted into the rendered environment 118. It can be appreciated that in some embodiments, this insertion can be accidental, while in some other embodiments, the insertion could be malicious (e.g., a malicious actor could intercept the cross-reality environment data 110 between the cross-reality service 112 and the user device 102, modify the cross-reality environment data 110 to include the unexpected experience, and forward the modified cross-reality environment data 110 to the user device 102). Because the unexpected experience can be inserted into the rendered environment 118 in additional and/or alternative manners, it should be understood that this example is illustrative, and therefore should not be construed as being limiting in any way.

As mentioned above, thresholds, expectations, comfort levels, and/or other preferences of the user 116 can be determined based on one or more settings, thresholds, or preferences associated with the user 116, which can be stored, in some embodiments as one or more profiles 134. Thus, the cross-reality safety service 122 also can be configured to obtain a profile 134 for the user 116 for analysis. In some embodiments, the profiles 134 can be keyed to the user 116, keyed to the user device 102, and/or otherwise identified as being associated with the user 116 (e.g., the user may log in to the cross-reality application 106 and/or cross-reality safety application 108, which can communicate credentials to the cross-reality safety service 122 in some embodiments). In some embodiments, the cross-reality safety service 122 also can determine if a threshold and/or comfort of the user 116 has been exceed without using a profile 134, for example, based on the cross-reality safety service 122 monitoring various aspects of the user 116 (e.g., via the sensor data 130) such as, for example, facial expressions of the user 116, speech of the user 116, pulse of the user 116, brain waves/signals of the user 116, or the like.

In some embodiments, the user 116 can define a "safe phrase," "safe word," and/or other speech that can be used to inform the cross-reality safety service 122 that an undesirable experience is occurring for the user 116. In some embodiments, a safe action or gesture can also be configured by the user 116, such that a facial movement, hand gesture, or other action can be used instead of and/or in addition to a safe phrase or safe word. The cross-reality safety service 122 can be configured to terminate the cross-reality session immediately if a safe word, safe phrase, safe gesture, or other safe action is detected, though this is not necessarily the case in all embodiments. It therefore can be appreciated that the cross-reality safety service 122 can determine that the cross-reality session should be terminated based on monitoring audio (e.g., speech captured by a microphone), cameras (e.g., facial expressions, hand movements, etc.), or other sensors (e.g., sensors in gloves that sense hand gestures, etc.). It should be understood that this example is illustrative, and therefore should not be construed as being limiting in any way.

In some other embodiments, the cross-reality safety service 122 can determine if any interactions with the rendered environment 118, for example the intersection of the physical environment 120 and the rendered environment 118, present any safety risks to the user 116 or other entities. For example, a user 116 immersed in a cross-reality session may be located in a physical environment 120 that includes one or more items that present a risk or threat of physical injury to the user 116 (e.g., moving cars, walls, bodies of water, etc.). The cross-reality safety service 122 can be configured to detect such scenarios and to perform operations or actions to remediate these and/or other types of threats to the user 116.

It again should be appreciated that in some embodiments, the risk or threat of physical injury can result accidentally or maliciously. In particular, it is contemplated that a malicious actor could intercept the cross-reality environment data 110 between the cross-reality service 112 and the user device 102, modify the cross-reality environment data 110 to mask some obstacle or object in the physical environment 120, to insert an unexpected experience, and/or to otherwise create risks and/or threats. The malicious actor may forward the modified cross-reality environment data 110 to the user device 102 in such a scenario. It should be understood that this example of malicious activity is illustrative, and therefore should not be construed as being limiting in any way.

In one contemplated case of fraud, a malicious actor may intercept the cross-reality environment data 110 between the cross-reality service 112 and the user device 102 and modify the cross-reality environment data 110 to present the risk or threat as harmless. For example, a floor in front of the user 116 may be depicted in the rendered environment 118 as a flat floor while in the physical environment 120, the floor in front of the user 116 may include a descending flight of stairs, a drop off a side of a building, a trip risk, a glass panel, combinations thereof, or the like. Thus, the user 116 may be at risk of injury due to this real world/virtual world mismatch, i.e., a mismatch between the physical environment 120 and the rendered environment 118. Similarly, there may not be a mismatch, but the user 116 may be at risk because his or her attention has been diverted (from the physical environment 120) to the rendered environment 118 due to the interest the user 116 has in the rendered environment, and therefore may be at risk of injury due to this diversion of attention. It should be understood that these examples are illustrative, and therefore should not be construed as being limiting in any way.

In another contemplated example, a sidewalk in front of the user 116 in the physical environment may be depicted in the rendered environment as continuing for some distance, while in real life, a roadway may be located directly in front of the user 116. Cars and/or other objects in the roadway may pose a threat to the user 116 and may not be perceptible to the user 116 due to attention being diverted to the rendered environment 118. In yet another contemplated embodiment, a dangerously sharp object such as a knife, broken glass, etc., in the physical environment 120 may be depicted in the rendered environment 118 as a soft object. Because many other types of risks are contemplated and are possible, it should be understood that these examples are illustrative, and therefore should not be construed as being limiting in any way.

Figure 2A:
FIGS. 2A-2F depict some aspects of the cross-reality safety service, according to some illustrative embodiments of the concepts and technologies described herein.
Figure 2B:
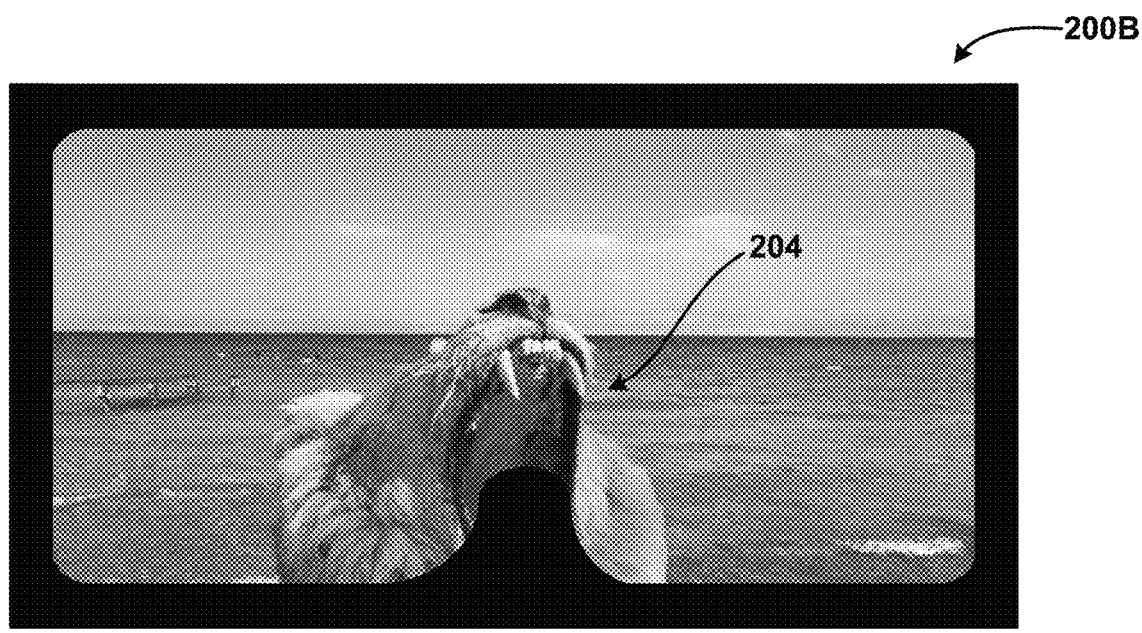

A visual example of one contemplated type of fraud or safety issues is shown illustrated in FIGS. 2A-2B. In FIG. 2A, an example view 200A through the cross-reality equipment 114 (e.g., a virtual reality headset) is shown. As can be seen in the view 200A, a beach 202 is being viewed in the rendered environment 118. The scene shown in the view 200A is peaceful and may correspond to a scene that was requested by the user 116, though this is not necessarily the case. As illustrated in FIG. 2B, an example view 200B is shown in which the peaceful scene has been interrupted by a startling object or other startling experience 204 (illustrated in FIG. 2B as a roaring lion). The unexpected insertion of the startling experience 204 (or other visual and/or audio interruption) may startle or otherwise disturb the user 116.

Thus, FIGS. 2A-2B can collectively illustrate a case in which the requested environment (as may be requested via the request data 132 and/or depicted by the cross-reality environment data 110) differs from the rendered environment 118 (e.g., as may be reflected in the cross-reality rendered environment data 126 and/or the sensor data 130). According to various embodiments of the concepts and technologies disclosed herein, the cross-reality safety service 122 can detect such a mismatch and perform operations to update the environment, to alert the user 116, and/or to terminate the cross-reality session. It should be understood that this example is illustrative, and therefore should not be construed as being limiting in any way.

Figure 2C:
Figure 2D:

A visual example of another contemplated type of fraud or safety issues is shown illustrated in FIGS. 2C-2D. In FIG. 2C, an example view 200C through the cross-reality equipment 114 (e.g., a virtual reality headset) is shown. As can be seen in the view 200C, a path through the woods (indicated generally at 206) is being displayed in the rendered environment 118. The depicted scene shown in the view 200C may be interpreted by the user 116 as enabling a long walk forward as there are no visible interruptions/obstacles along the path shown in the view 200C. FIG. 2D shows an example scenario in which the user 116 viewing the view 200C in FIG. 2C may be walking through a dangerous area and therefore may be subjected to various risks.

In the example scenario illustrated in FIG. 2D, a user 116 is viewing the view 200C while walking through a busy street while a threat (in this case a car 208) is approaching. In particular, the user 116 is depicted in FIG. 2D as walking through a busy city on a crosswalk with a car 208 approaching the location of the user 116 in the physical environment 120. Thus, FIGS. 2C-2D can collectively illustrate a case in which interactions of the user 116 in the rendered environment 118 may pose a safety risk in the physical environment 120. According to various embodiments of the concepts and technologies disclosed herein, the cross-reality safety service 122 can detect such a safety issue and perform operations to update the environment, to alert the user 116, and/or to terminate the cross-reality session. It should be understood that this example is illustrative, and therefore should not be construed as being limiting in any way.

Figure 2E:

A visual example of another contemplated type of fraud or safety issues is shown illustrated in FIG. 2E. In FIG. 2E, an example view 200E through the cross-reality equipment 114 (e.g., a virtual reality headset) is depicted. As can be seen in the view 200E, a soft object (e.g., a cat in the illustrated example) is being displayed in the rendered environment 118. In some embodiments, the texture of the rendered object (in this case a cat) may be referred to herein as a "virtual texture." As can be seen in FIG. 2E, however, a texture of a threat in the physical environment 120 (e.g., a sharp surface such as nails) is may be in a corresponding location (relative to the cat) in the proximity of the user 116 in the physical environment 120. Thus, the user 116 may touch the sharp item and hurt himself or herself. The texture of the real object in the physical environment may be referred to herein as a "real texture." According to various embodiments of the concepts and technologies disclosed herein, the cross-reality safety service 122 can detect such a safety issue and perform operations to update the environment, to alert the user 116, and/or to terminate the cross-reality session. It should be understood that this example is illustrative, and therefore should not be construed as being limiting in any way.

According to various embodiments of the concepts and technologies disclosed herein, the cross-reality safety service 122 can analyze the cross-reality environment data 110 and/or the request data 132 (if included), along with the cross-reality rendered environment data 126 and/or the sensor data 130 to determine if a safety issue or threat exists in the rendered environment 118 and/or the physical environment 120. In some embodiments, the cross-reality safety service 122 can detect a cross-reality session at or associated with the user device 102. In some embodiments of the concepts and technologies disclosed herein, the cross-reality safety service 122 can operate as a callable or requestable service to provide safety for cross-reality sessions and therefore can detect the cross-reality session by receiving data from the cross-reality service 112 and/or the user device 102. Because the cross-reality safety service 122 can detect the cross-reality session in additional and/or alternative manners, it should be understood that this example is illustrative, and therefore should not be construed as being limiting in any way.

The cross-reality safety service 122 can obtain data from the user device 102, the cross-reality service 112, and/or other devices. In some embodiments, the cross-reality safety service 122 can obtain, from the user device 102, one or more of the cross-reality rendered environment data 126, the sensor data 130, and/or the request data 132. In some embodiments, the cross-reality safety service 122 also can obtain, from the cross-reality service 112, one or more of the cross-reality environment data 110 and/or the request data 132. The cross-reality safety service 122 also can obtain, locally or from other devices, one or more profiles 134. The cross-reality safety service 122 can analyze the data obtained from the user device 102 and/or the cross-reality safety service 122 and determine, based on the analysis, if a safety or fraud risk exists for the user 116 in association with the cross-reality session. As noted above, the cross-reality safety service 122 can make this determination in multiple manners.

If the cross-reality safety service 122 determines that a potential or actual safety risk exists in the cross-reality session (e.g., in the rendered environment 118, the physical environment 120, and/or the interaction between these environments), the cross-reality safety service 122 can determine an action to take to remedy the safety issue. In some embodiments, the cross-reality safety service 122 can be configured to generate one or more updates 136. According to various embodiments of the concepts and technologies disclosed herein, the updates 136 can include a command that, when received by the user device 102, can cause the user device 102 to terminate the cross-reality session. In some other embodiments, the updates 136 can include instructions to the user device 102 to update the cross-reality session and/or the rendered environment 118 to remove, remediate, and/or otherwise address the safety issue identified by the cross-reality safety service 122.

In the example shown in FIG. 2B, for example, the cross-reality safety service 122 can issue an update 136 to cause the user device 102 (e.g., via the cross-reality application 106 and/or cross-reality safety application 108) or the cross-reality service 112 to remove the roaring lion or other startling experience 204 from the rendered environment 118. In some embodiments, the cross-reality safety service 122 may not communicate directly with the cross-reality service 112. For example, the cross-reality safety service 122 may not communicate directly with the cross-reality service 112 to make changes to the cross-reality session for various reasons, such as to avoid malicious actors between the cross-reality service 112 and the user device 102 from stopping the update 136 from being implemented at the user device 102 or other device. It should be understood that this example is illustrative, and therefore should not be construed as being limiting in any way.

In the examples shown in FIGS. 2D and 2E, for example, the cross-reality safety service 122 can issue an update 136 to cause the user device 102 (e.g., via the cross-reality application 106 and/or cross-reality safety application 108) to reveal, to the user 116, the dangerous objects in the physical environment 120. Because other types of updates 136 are possible and are contemplated, it should be understood that these examples are illustrative, and therefore should not be construed as being limiting in any way.

Figure 2F:

In some other embodiments, if the cross-reality safety service 122 determines that a potential or actual safety risk exists in the cross-reality session (e.g., in the rendered environment 118, the physical environment 120, and/or the interaction between these environments), the cross-reality safety service 122 can be configured to generate one or more alerts 138. An example of a screen alert 210 is shown in the view 200F shown in FIG. 2F. The screen alert 210 can inform a user 116 of the risk. In the illustrated embodiment of FIG. 2F, the risk can include an injury to the hand 212 of the user. It should be understood that this example is illustrative, and therefore should not be construed as being limiting in any way. Additionally, it should be understood that the alert 138 can be provided as an audio alert or other type of alert that can be delivered in various manners including audio, video, imagery, haptic feedback, combinations thereof, or the like. As such, the illustrated embodiment of the screen alert 210 should be understood as being illustrative of the concepts and technologies disclosed herein, and therefore should not be construed as being limiting in any way.

In particular, according to various embodiments of the concepts and technologies disclosed herein, the alerts 138 can be provided to the cross-reality equipment 114 (e.g., via the user device 102 and/or the cross-reality service 112) as an audio alert, a text alert, or other visual alert that can notify the user 116 of the safety issue. In some other embodiments, the alerts 138 can be sent to the user device 102 for output at the user device 102. In some embodiments, the cross-reality safety service 122 may not communicate with the cross-reality service 112 in an attempt to avoid malicious actors between the cross-reality service 112 and the user device 102 from stopping the alert 138 from reaching the user device 102 and/or the user 116. Because the alert 138 can be provided in additional and/or alternative manners, it should be understood that these examples are illustrative, and therefore should not be construed as being limiting in any way.

In practice, a user 116 of a user device 102 can request a cross-reality session. In some embodiments, the user device 102 can execute a cross-reality application 106 that can create a request for the cross-reality session and send the request to a cross-reality service 112. The cross-reality service 112 can generate cross-reality environment data 110 and send the cross-reality environment data 110 to the user device 102 for rendering. In some embodiments, the cross-reality application 106 at the user device 102 can generate the rendered environment 118 based on the cross-reality environment data 110. According to various embodiments of the concepts and technologies disclosed herein, cross-reality equipment 114 used by the user 116 can include various sensors 128 for monitoring the user 116 and/or the physical environment 120 of the user 116. It should be understood that this example is illustrative, and therefore should not be construed as being limiting in any way.

In various embodiments, the cross-reality safety service 122 can be hosted and/or executed by the server computer 124. The cross-reality safety service 122 can detect the cross-reality session based on communications with one or more of the user device 102 and/or the cross-reality service 112. For example, in some embodiments, the functionality of the cross-reality safety service 122 can be requested or invoked by one or more requests, service calls, and/or receiving data from one or more devices. In some embodiments, for example, the cross-reality service 112 can provide the cross-reality environment data 110 to the cross-reality safety service 122 in addition to the user device 102, whereby the cross-reality safety service 122 can detect the cross-reality session. In some embodiments, the cross-reality service 112 can provide request data 132 that can define the cross-reality environment requested by the user device 102, whereby the cross-reality safety service 122 can detect the cross-reality session. Because the cross-reality safety service 122 can detect the cross-reality session in additional and/or alternative manners, it should be understood that these examples are illustrative, and therefore should not be construed as being limiting in any way.

The cross-reality safety service 122 can obtain data from one or more of the user device 102, the cross-reality service 112, and/or other local and/or remote devices. The cross-reality safety service 122 can obtain the cross-reality environment data 110, cross-reality rendered environment data 126, the sensor data 130, the request data 132, and/or the profile 134. The cross-reality environment data 110 can define the environment to be generated in association with the cross-reality session. The cross-reality rendered environment data 126 can define the rendered environment 118 that has been generated by the user device 102. The sensor data 130 can include readings and/or other output obtained from the sensors 128. The request data 132 can define the requested cross-reality session. The profile 134 can define preferences, settings, and/or thresholds associated with the user 116.

The cross-reality safety service 122 can analyze the data and determine, based on the analysis, if a safety issue exists in the cross-reality session and/or if any safe word, safe phrase, safe gesture, and/or safe action has been detected. If the cross-reality safety service 122 determines that a safety issue exists in the cross-reality session and/or the use of a safe phrase or the like, the cross-reality safety service 122 can generate one or more updates 136 and/or alerts 138. The updates 136 can be used to update the rendered environment 118, to terminate the cross-reality session, and/or to take other actions. The alerts 138 can notify the user 116 and/or other entities about the safety issue. Remedial action can be taken to address the safety issue.

According to various embodiments, the cross-reality safety service 122 can be configured to perform event aggregation during or after any safety issue is detected and/or remediated. For example, the cross-reality safety service 122 can be configured to perform event aggregation across one or more users 116, one or more user devices 102, one or more rendered environments 118, or one or more physical environments 120, during or after any use of a safe phrase, safe word, or safe action and/or upon any other detection of a safety issue. The cross-reality safety service 122 can perform the event aggregation to update one or more thresholds and/or models, and/or other information that may be used to detect safety issues, any and/or all of which can be included in the profiles 134. The cross-reality safety service 122 can perform the event aggregation with respect to a profile 134 associated with the user 116 and/or with respect to more than one profile 134, with respect to configurations, with respect to settings, combinations thereof, or the like.

In some embodiments, the cross-reality safety service 122 can update the thresholds and models (and/or the profiles 134) based on the safety issue detected to reflect the type of experience that prompted the user 116 to use the safe phrase, safe word, or safe action; the type of mismatch detected between a requested cross-reality session and the rendered environment 118; the type of experience that caused the user 116 to divert his or her attention from the physical environment 120; and/or the type of mismatch between the physical environment 120 and the rendered environment 118 that has been detected. Thus, it can be appreciated that some embodiments of the concepts and technologies disclosed herein include a feedback loop to update the profiles 134 and/or to aggregate various experiences and/or safety issues across users. It should be understood that this example is illustrative, and therefore should not be construed as being limiting in any way.

FIG. 1 illustrates one user device 102, one network 104, one cross-reality service 112, and one server computer 124. It should be understood, however, that various implementations of the operating environment 100 can include one or more than one user device 102; one or more than one network 104; zero, one, or more than one cross-reality service 112; and/or zero, one, or more than one server computer 124. As such, the illustrated embodiment should be understood as being illustrative, and should not be construed as being limiting in any way.

Figure 3:
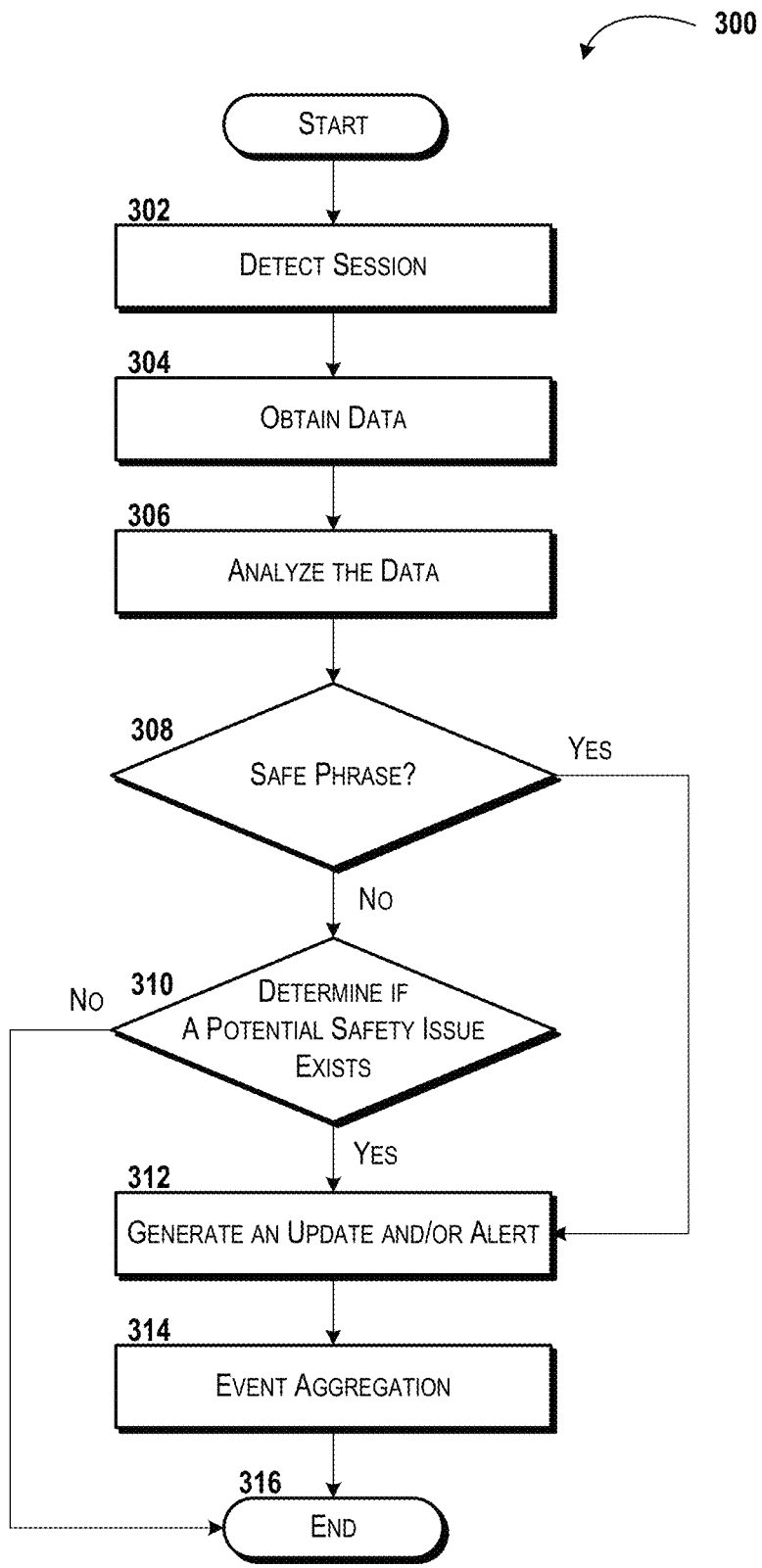
FIG. 3 is a flow diagram showing aspects of a method for detecting a safety issue or safe phrase during a cross-reality session using a cross-reality safety service, according to an illustrative embodiment of the concepts and technologies described herein.

Turning now to FIG. 3, aspects of a method 300 for detecting a safety issue or safe phrase during a cross-reality session using a cross-reality safety service will be described in detail, according to an illustrative embodiment. It should be understood that the operations of the methods disclosed herein are not necessarily presented in any particular order and that performance of some or all of the operations of the methods disclosed herein in an alternative order(s) is possible and is contemplated. The operations of the methods illustrated and described herein have been presented in the demonstrated order for ease of description and illustration. Operations of the methods illustrated and described herein may be added, omitted, and/or performed simultaneously, without departing from the scope of the concepts and technologies disclosed herein.

It also should be understood that the methods disclosed herein can be ended at any time and need not be performed in its entirety. Some or all operations of the methods, and/or substantially equivalent operations, can be performed by execution of computer-readable instructions included on a computer storage media, as defined herein. The term "computer-readable instructions," and variants thereof, as used herein, is used expansively to include routines, applications, application modules, program modules, programs, components, data structures, algorithms, and the like. Computer-readable instructions can be implemented on various system configurations including single-processor or multiprocessor systems, minicomputers, mainframe computers, personal computers, hand-held computing devices, microprocessor-based, programmable consumer electronics, combinations thereof, and the like.

Thus, it should be appreciated that the logical operations described herein are implemented (1) as a sequence of computer implemented acts or program modules running on a computing system and/or (2) as interconnected machine logic circuits or circuit modules within the computing system. The implementation is a matter of choice dependent on the performance and other requirements of the computing system. Accordingly, the logical operations described herein are referred to variously as states, operations, structural devices, acts, or modules. These states, operations, structural devices, acts, and modules may be implemented in software, in firmware, in special purpose digital logic, and any combination thereof. As used herein, the phrase "cause a processor to perform operations" and variants thereof is used to refer to causing a processor of a computing system or device, such as the user device 102 and/or the server computer 124, to perform one or more operations and/or causing the processor to direct other components of the computing system or device to perform one or more of the operations.

For purposes of illustrating and describing the concepts of the present disclosure, the method 300 is described herein as being performed by the server computer 124 via execution of one or more software modules such as, for example, the cross-reality safety service 122. It should be understood that additional and/or alternative devices and/or network nodes can provide the functionality described herein via execution of one or more modules, applications, and/or other software including, but not limited to, the cross-reality safety service 122. Thus, the illustrated embodiments are illustrative, and should not be viewed as being limiting in any way.

The method 300 can begin at operation 302. At operation 302, the server computer 124 can detect a cross-reality session. The cross-reality session detected in operation 302 can correspond to a cross-reality session at and/or associated with the user device 102. According to various embodiments, the server computer 124 can detect the cross-reality session in various manners. In some embodiments, for example, the server computer 124 can detect the cross-reality session by receiving, from the cross-reality service 112, the cross-reality environment data 110 and/or the request data 132. In some other embodiments, the cross-reality service 112 can inform the server computer 124 of the cross-reality session without providing any data to the server computer 124.

In some other embodiments, the server computer 124 can detect the cross-reality session by receiving, from the user device 102, the cross-reality rendered environment data 126, the sensor data 130, and/or the request data 132. In some other embodiments, the user device 102 can inform the server computer 124 of the cross-reality session without providing any data to the server computer 124 at this point in time. For example, the functionality of the server computer 124 can be requested and/or invoked by the user device 102 via a request or service call, for example. Because the server computer 124 can detect the cross-reality session in additional and/or alternative manners, it should be understood that these examples are illustrative, and therefore should not be construed as being limiting in any way.

From operation 302, the method 300 can proceed to operation 304. At operation 304, the server computer 124 can obtain data associated with the cross-reality session detected in operation 302. According to various embodiments, the server computer 124 can obtain the data in operation 304 from the user device 102, the cross-reality service 112, and/or other local and/or remote devices. In particular, in some embodiments, the server computer 124 can obtain, from the user device 102, the cross-reality rendered environment data 126, the sensor data 130, and/or the request data 132. In some other embodiments, the server computer 124 can obtain, from the cross-reality service 112, the cross-reality environment data 110 and/or the request data 132.

The server computer 124 also can obtain, from a local and/or remote device, one or more profiles 134. A profile 134 that is associated with the user 116 and/or the user device 102 can be identified, in some embodiments. In some embodiments, the server computer 124 can obtain the data in operation 304 by requesting the data from the user device 102, the cross-reality service 112, and/or other local or remote devices. In some other embodiments, the server computer 124 can obtain the data in operation 304 by receiving the data from the user device 102, the cross-reality service 112, and/or other local or remote devices. Because the data can be obtained in operation 304 in additional and/or alternative manners, it should be understood that these examples are illustrative, and therefore should not be construed as being limiting in any way.

From operation 304, the method 300 can proceed to operation 306. At operation 306, the server computer 124 can analyze the data obtained in operation 304. As explained above, the server computer 124 can analyze the data for one or more types of safety issues and/or fraud including, but not limited to, determining if a safe phrase or action has been detected, determining if the rendered environment 118 does not match the requested cross-reality environment or if other expectations of the user 116 are not met by the rendered environment 118, by determining if attention of the user 116 is masking a risk or threat of physical injury exists in the physical environment 120, by determining if there is a mismatch between the rendered environment 118 and the physical environment 120, and/or by otherwise recognizing a safety and/or fraud issue.

As explained above, the user 116 or other entity can define a safe phrase, safe word, or safe action (e.g., facial expression, hand gesture, body movement, etc.) that, when spoken, performed, or completed, can inform the server computer 124 that some experience in the rendered environment 118 is undesirable to the user 116 (e.g., the experience may be too intense or otherwise unpleasant or unenjoyable for the user 116). In some embodiments, the server computer 124 can be configured to immediately terminate the cross-reality session when the safe phrase, safe word, and/or safe action is detected. It therefore can be appreciated that the server computer 124 can analyze the data obtained in operation 304 to determine if a safe phrase or safe word has been spoken, if a safe gesture or other action has been performed, combinations thereof, or the like. Because a safe phrase, safe word, or other safe action can be detected in other ways, it should be understood that these examples are illustrative, and therefore should not be construed as being limiting in any way.

In some other embodiments, the server computer 124 can analyze the data obtained in operation 304 to determine if any aspects of the rendered environment 118 differ from the original intent of the user 116 and/or requested cross-reality environment. Thus, for example, the server computer 124 can analyze the request data 132 to determine one or more aspects of the requested cross-reality environment (e.g., materials, haptic feedback, sounds, etc.) and determine, based on an analysis of the cross-reality rendered environment data 126, if the rendered environment 118 matches the requested cross-reality environment. In some embodiments, the server computer 124 can determine that a mismatch between the rendered environment 118 and the requested cross-reality session exists without obtaining and/or analyzing the request data 132.

For example, as noted above, the server computer 124 can determine, based on an analysis of the cross-reality rendered environment data 126 and/or the sensor data 130, if the rendered environment 118 includes any experience that exceeds a personal comfort or safety threshold of the user 116. For example, a malicious or accidental insertion of some experience in the rendered environment 118 can upset the user 116 or otherwise render the cross-reality session undesirable and/or unenjoyable. As such, the detection of such experiences can be provided by server computer 124 to protect the user 116 from such experiences. Thus, in some embodiments, the server computer 124 can determine whether or not the rendered environment 118 differs from the requested cross-reality environment in terms of visual features, audio features, textures, characters, and/or activities such that interactions of the user 116 with the rendered environment 118 are not consistent with the requested interactions. In such a case, the server computer 124 can determine that there exists a compromised integrity of the virtual content. Because a mismatch between the rendered environment 118 and the requested cross-reality session can be determined in other ways, it should be understood that these examples are illustrative, and therefore should not be construed as being limiting in any way.

In some other embodiments of operation 306, the server computer 124 can determine if there are any aspects of the rendered environment 118 that present a potential safety issue to the user 116, where attention to the rendered environment 118 may mask the risk and/or threat. In particular, the server computer 124 can determine if any risks or threats in the physical environment 120 present any safety risks to the user 116 or other entities, where such risks or threats may be unknown to the user 116 due to the attention of the user 116 being directed to the rendered environment 118. For example, a user 116 immersed in a cross-reality session may be located in a physical environment 120 that includes one or more items that present a risk or threat of physical injury to the user 116 (e.g., moving cars, walls, bodies of water, etc.). Thus, the server computer 124 may determine that the attention of the user 116 makes it unlikely that the user 116 will detect the threat in the physical environment 120. It should be understood that this example is illustrative, and therefore should not be construed as being limiting in any way.

In another embodiment of operation 306, the server computer 124 can determine if something in the physical environment 120 poses a risk to the user 116 not due to lack of attention, but due to malicious or accidental masking and/or misrepresentation of the risk. For example, a pathway in the rendered environment 118 may appear to extend for the next ten steps of the user 116, while in the physical environment 120, an edge of a ravine or building may be located only a few steps front of the user 116. Thus, the user 116 may be at risk of injury due to this real world/virtual world mismatch, i.e., a mismatch between the physical environment 120 and the rendered environment 118. Because many other types of risks are contemplated and are possible, it should be understood that this example is illustrative, and therefore should not be construed as being limiting in any way.

From operation 306, the method 300 can proceed to operation 308. At operation 308, the server computer 124 can determine if the data obtained in operation 304 includes or represents a safe phrase or other signal to immediately terminate the cross-reality session. In some embodiments, the server computer 124 can make this determination by analyzing the sensor data 130. In particular, the sensor data 130 can include audio captured by a microphone. The server computer 124 can perform speech recognition on the audio (or request other devices to perform the speech recognition on the audio) and determine, based on examining text output from the speech recognition, if a safe word, safe phrase, or the like has been said by the user 116. Because the safe phrase can be detected in additional and/or alternative manners, it should be understood that this example is illustrative, and therefore should not be construed as being limiting in any way.

If the server computer 124 determines, in operation 308, that the data obtained in operation 304 does not include or represent a safe phrase, the method 300 can proceed to operation 310. It should be understood that in some embodiments, the method 300 can proceed to operation 310 if a safe phrase is detected as well (though the cross-reality session may be terminated before the functionality of operation 310 is performed). Such embodiments are contemplated to determine why the safe phrase or word was detected, for example, or for other "post-mortem" analysis as will be discussed below with reference to event aggregation. It should be understood that this example is illustrative, and therefore should not be construed as being limiting in any way.

At operation 310, the server computer 124 can determine if a potential safety issue exists during the cross-reality session detected in operation 302. In operation 310, the server computer 124 can determine, based on the analysis in operation 306, if the safety issue exists. In particular, the server computer 124 can determine, for example, if a scary, unpleasant, or otherwise unexpected experience has been inserted into the rendered environment 118, or if there is some other way the rendered environment 118 does not match the requested cross-reality session; if a lack of attention by the user to the physical environment 120 masks a risk or threat of injury; and/or if there is a malicious or accidental mismatch in an intersection between the physical environment 120 and the rendered environment 118 (e.g., a soft surface in the rendered environment 118 actually is a sharp and/or dangerous object in the physical environment 120). Because other types of threats and/or risks are contemplated and are possible, it should be understood that these examples are illustrative, and therefore should not be construed as being limiting in any way.

If the server computer 124 determines, in operation 310, that the potential safety issue exists during the cross-reality session detected in operation 302, the method 300 can proceed to operation 312. The method 300 also can proceed to operation 312 from operation 308 if the server computer 124 determines, in operation 308, that the data obtained in operation 304 includes or represents a safe phrase (though some embodiments of the method 300 may also flow through operation 310 in such cases, as noted above). At operation 312, the server computer 124 can generate an update 136 and/or alert 138. According to some embodiments, the update 136 can include a command to immediately terminate the cross-reality session if the method 300 flows to operation 312 from operation 308 (and the safe phrase has been mentioned), though this is not necessarily the case in all embodiments.

Thus, in some embodiments of the concepts and technologies disclosed herein, as noted above, the updates 136 can include a command that, when received by the user device 102, the cross-reality service 112, and/or other devices, can cause the termination of the cross-reality session. In some embodiments, for example, the command can be sent to the user device 102, and the user device 102 can terminate the cross-reality session. It should be understood that the server computer 124 can generate updates 136 that terminate the cross-reality session or make changes to the cross-reality session in other circumstances and/or in response to other events and/or determinations. As such, it should be understood that this example is illustrative, and therefore should not be construed as being limiting in any way.

As noted above, the updates 136 are not necessarily configured to terminate the cross-reality session in some embodiments. In particular, the updates 136 can be configured to remediate and/or otherwise address the detected threat and/or risks. For example, the updates 136 can include instructions to the user device 102 or other entities or devices to update the cross-reality session and/or the rendered environment 118 to remove, remediate, and/or otherwise address the safety issue identified by the server computer 124. In some other embodiments, the server computer 124 may send the updates 136 to the cross-reality service 112 for updating the cross-reality session. In some embodiments, the server computer 124 may not communicate with the cross-reality service 112 to avoid malicious actors between the cross-reality service 112 and the user device 102 from stopping the update 136. Because other types of updates 136 are possible and are contemplated, and because the updates 136 can be sent to various devices, applications, services, and/or other entities, it should be understood that these examples are illustrative, and therefore should not be construed as being limiting in any way.

According to various embodiments of the concepts and technologies disclosed herein, the server computer 124 can generate alerts 138. As noted above, the alerts 138 can be provided to the cross-reality equipment 114 (e.g., via the user device 102 and/or the cross-reality service 112), the user device 102, and/or other devices or entities. The alerts 138 can be provided as one or more audio alerts, text alerts, haptic feedback, and/or other visual or non-visual alerts that can notify the user 116 of the safety issue. In some embodiments, the cross-reality safety service 122 may not communicate with the cross-reality service 112 to avoid malicious actors between the cross-reality service 112 and the user device 102 from stopping the alert 138. It should be understood that this example is illustrative, and therefore should not be construed as being limiting in any way. Because the alert 138 can be provided in additional and/or alternative manners, it should be understood that these examples are illustrative, and therefore should not be construed as being limiting in any way.

From operation 312, the method 300 can proceed to operation 314. At operation 314, the server computer 124 can perform event aggregation. According to various embodiments, the server computer 124 can use event aggregation to update the thresholds and models, and/or other information that may be used to detect safety issues. Thus, operation 314 can correspond to the server computer 124 updating the thresholds and models based on the safety issue detected in operations 308 and/or 310. These thresholds and models can be updated to reflect the type of experience that prompted the user 116 to use the safe phrase, safe word, or safe action; the type of mismatch detected between a requested cross-reality session and the rendered environment 118; the type of experience that caused the user 116 to divert his or her attention from the physical environment 120; and/or the type of mismatch between the physical environment 120 and the rendered environment 118 that has been detected.

These thresholds and models can be stored as part of the profiles 134, in particular as part of the profile 134 associated with the user 116, in various embodiments. Thus, it can be appreciated that some embodiments of the concepts and technologies disclosed herein include a feedback loop to update the profiles 134 and/or to aggregate various experiences and/or safety issues across users. Furthermore, it can be appreciated that operation 314 can correspond to the server computer 124 updating the profiles 134. It should be understood that this example is illustrative, and therefore should not be construed as being limiting in any way.

From operation 314, the method 300 can proceed to operation 316. The method 300 also can proceed to operation 316 if the server computer 124 determines, in operation 310, that a potential safety issue does not exist during the cross-reality session detected in operation 302. The method 300 can end at operation 316.

Figure 4:
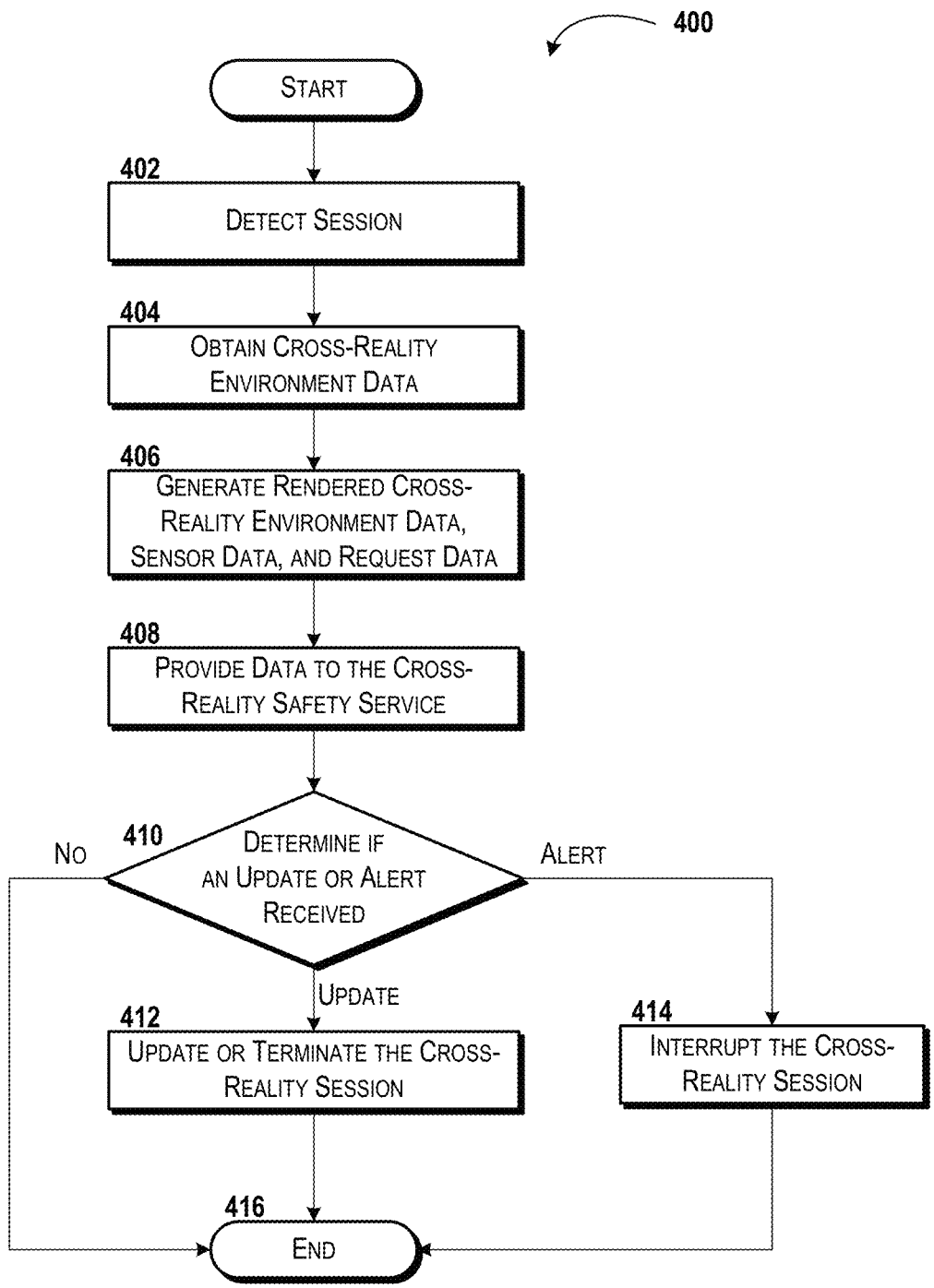
FIG. 4 is a flow diagram showing aspects of a method for interacting with a cross-reality safety service, according to an illustrative embodiment of the concepts and technologies described herein.

Turning now to FIG. 4, aspects of a method 400 for interacting with a cross-reality safety service 122 will be described in detail, according to an illustrative embodiment. For purposes of illustrating and describing the concepts of the present disclosure, the method 400 is described herein as being performed by the user device 102 via execution of one or more software modules such as, for example, the cross-reality application 106 and/or the cross-reality safety application 108. It should be understood that additional and/or alternative devices and/or network nodes can provide the functionality described herein via execution of one or more modules, applications, and/or other software including, but not limited to, the cross-reality application 106 and/or the cross-reality safety application 108. Thus, the illustrated embodiments are illustrative, and should not be viewed as being limiting in any way.

The method 400 can begin at operation 402. At operation 402, the user device 102 can detect a cross-reality session occurring at the user device 102. According to various embodiments, the user device 102 can detect the cross-reality session in various manners. In some embodiments, for example, the user device 102 can detect the cross-reality session by receiving, from the cross-reality service 112, the cross-reality environment data 110. In some other embodiments, the user device 102 can detect the cross-reality session by detecting activation of the cross-reality application 106 to render the cross-reality environment data 110 and/or in response to detecting the activation of the cross-reality equipment 114. Because the user device 102 can detect the cross-reality session in additional and/or alternative manners, it should be understood that these examples are illustrative, and therefore should not be construed as being limiting in any way.

From operation 402, the method 400 can proceed to operation 404. At operation 404, the user device 102 can obtain the cross-reality environment data 110. According to various embodiments of the concepts and technologies disclosed herein, the user device 102 can receive the cross-reality environment data 110 from the cross-reality service 112. According to various embodiments of the concepts and technologies disclosed herein, the user device 102 can obtain the cross-reality environment data 110 in response to requesting a cross-reality session. In some other embodiments, the user device 102 can receive the cross-reality environment data 110 without explicitly requesting the cross-reality environment data 110. At any rate, the cross-reality environment data 110 can be used by the user device 102 to generate the rendered environment 118.

From operation 404, the method 400 can proceed to operation 406. At operation 406, the user device 102 can generate cross-reality rendered environment data 126, sensor data 130, and/or request data 132. According to various embodiments, the user device 102 can obtain the cross-reality rendered environment data 126 from the cross-reality application 106 and/or the cross-reality safety application 108. According to various embodiments, the user device 102 can generate the cross-reality rendered environment data 126 by monitoring the cross-reality session (e.g., by monitoring data that is provided to the cross-reality equipment 114 to generate the rendered environment 118 associated with the cross-reality session). In some other embodiments, the cross-reality equipment 114 can provide the cross-reality rendered environment data 126 to the user device 102 as output. Because the user device 102 can obtain and/or generate the cross-reality rendered environment data 126 in additional and/or alternative manners, it should be understood that these examples are illustrative, and therefore should not be construed as being limiting in any way.

The user device 102 can include the sensors 128 and/or can communicate with one or more other devices that can include the sensors 128. Regardless of where the sensors 128 are located, the sensor data 130 can include audio files (e.g., speech and/or other sounds generated by the user 116 and/or speakers of the cross-reality equipment 114, or the like); images and/or video (captured by one or more cameras); temperature information; pulse, respiration, oxygen saturation, neurological activity, attention information, and/or other information associated with the user 116; orientation, movement, and/or motion associated with the user 116 and/or the cross-reality equipment 114; combinations thereof; or the like. Thus, operation 406 can correspond to the user device 102 generating the sensor data 130 based on output from the sensors 128 and/or receiving the sensor data 130 from other sensor-bearing devices (e.g., the cross-reality equipment 114 can include the sensors 128 in various embodiments). It should be understood that this example is illustrative, and therefore should not be construed as being limiting in any way.

The user device 102 also can generate the request data 132. According to various embodiments, the user device 102 can generate the request data 132 based on the cross-reality session requested by the user device 102. Thus, the request data 132 can correspond to the requested session including, but not limited to, characters, story lines, structures, movements, locations, combinations thereof, or the like. As noted above, the request data 132 can also be generated by the cross-reality service 112 in some embodiments, so it should be understood that this example is illustrative, and therefore should not be construed as being limiting in any way.

From operation 406, the method 400 can proceed to operation 408. At operation 408, the user device 102 can provide one or more of the cross-reality rendered environment data 126, the sensor data 130, and/or the request data 132 to the cross-reality safety service 122. As explained above, the user device 102 can provide these and/or other data to the cross-reality safety service 122 to invoke the functionality of the cross-reality safety service 122, in some embodiments. In some other embodiments, the user device 102 can request and/or call the cross-reality safety service 122 and the cross-reality safety service 122 can request the data from the user device 102. In yet other embodiments, the user device 102 can provide the data to the cross-reality safety service 122 at other times and/or in response to other triggers and/or events. As such, the above examples should not be construed as being limiting in any way.

From operation 408, the method 400 can proceed to operation 410. At operation 410, the user device 102 can determine if an update, alert, or other notification such as, for example, the update 136 and/or the alert 138, has been received by the user device 102. According to various embodiments of operation 410, the user device 102 can determine if any update 136, alert 138, and/or other notification has been received from the server computer 124 and/or other devices and/or entities (e.g., the cross-reality service 112 and/or other entities). In some embodiments, the cross-reality safety application 108 can monitor incoming communications to determine if any of the communications correspond to the update 136 and/or the alert 138. Because the user device 102 can determine that the update 136, alert 138, and/or other notification has been received in additional and/or alternative manners, it should be understood that these examples are illustrative, and therefore should not be construed as being limiting in any way.

If the user device 102 determines, in operation 410, that an update 136 has been received, the method 400 can proceed to operation 412. At operation 412, the user device 102 can terminate the cross-reality session and/or update the cross-reality session. As noted above, the update 136 can include a command to terminate the cross-reality session in some embodiments, while in other embodiments, the update 136 may include a command to update the cross-reality session (without terminating the cross-reality session).

Thus, in operation 412 the user device 102 can terminate the cross-reality session, update the rendered environment 118, or take some other action based on the update 136. In some embodiments, the update 136 can include a command that, when received by the user device 102, can cause the user device 102 to terminate the cross-reality session, so operation 412 can correspond to the user device 102 terminating the cross-reality session, in some embodiments. In some other embodiments, the update 136 can include instructions to the user device 102 to update the cross-reality session and/or the rendered environment 118 to remove, remediate, and/or otherwise address the safety issue identified by the cross-reality safety service 122. Thus, in some embodiments, in operation 412, the user device 102 can update the rendered environment 118 to address the safety issue identified. Because other actions can be taken by the user device 102 in response to receiving the update 136, it should be understood that these examples are illustrative, and therefore should not be construed as being limiting in any way.

If the user device 102 determines, in operation 410, that an alert 138 has been received, the method 400 can proceed to operation 414. At operation 414, the user device 102 can interrupt the cross-reality session, for example, to provide the alert 138 to the user 116. According to various embodiments of the concepts and technologies disclosed herein, the alerts 138 can be provided to the cross-reality equipment 114 (e.g., via the user device 102) as an audio alert, a text alert, or other visual alert that can notify the user 116 of the safety issue. Thus, operation 414 can correspond, in some embodiments, to the user device 102 outputting a notification or other type of alert 138 to the user 116. It should be understood that this example is illustrative, and therefore should not be construed as being limiting in any way. Because the alert 138 can be provided in additional and/or alternative manners, it should be understood that these examples are illustrative, and therefore should not be construed as being limiting in any way.

From operation 412, the method 400 can proceed to operation 416. The method 400 also can proceed to operation 416 from operation 414. The method 400 can end at operation 416.

Figure 5:
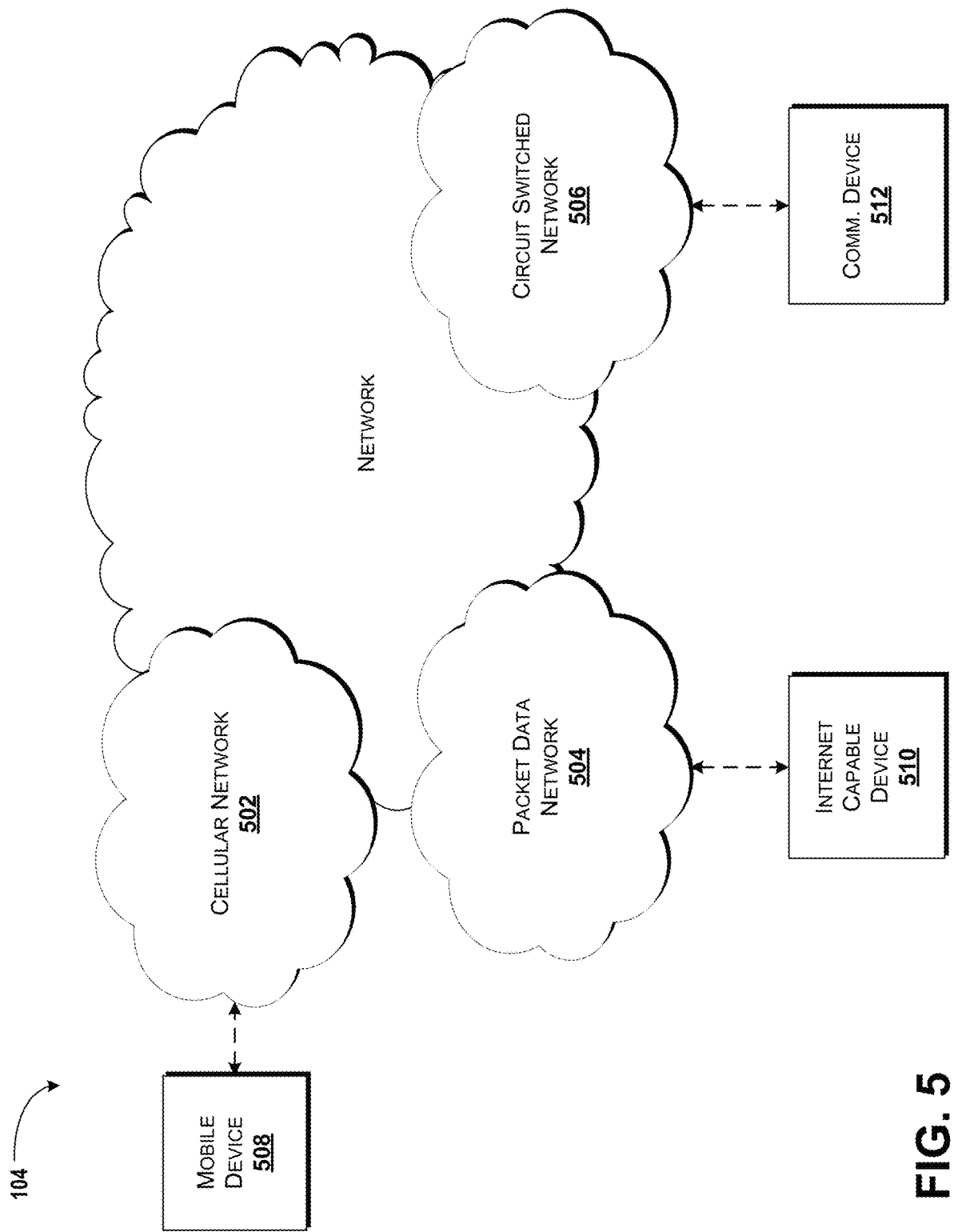
FIG. 5 schematically illustrates a network, according to an illustrative embodiment of the concepts and technologies described herein.

Turning now to FIG. 5, additional details of the network 104 are illustrated, according to an illustrative embodiment. The network 104 includes a cellular network 502, a packet data network 504, for example, the Internet, and a circuit switched network 506, for example, a publicly switched telephone network ("PSTN"). The cellular network 502 includes various components such as, but not limited to, base transceiver stations ("BTSs"), Node-B's or e-Node-B's, base station controllers ("BSCs"), radio network controllers ("RNCs"), mobile switching centers ("MSCs"), mobile management entities ("MMEs"), short message service centers ("SMSCs"), multimedia messaging service centers ("MMSCs"), home location registers ("HLRs"), home subscriber servers ("HSSs"), visitor location registers ("VLRs"), charging platforms, billing platforms, voicemail platforms, GPRS core network components, location service nodes, an IP Multimedia Subsystem ("IMS"), and the like. The cellular network 502 also includes radios and nodes for receiving and transmitting voice, data, and combinations thereof to and from radio transceivers, networks, the packet data network 504, and the circuit switched network 506.

A mobile communications device 508, such as, for example, a cellular telephone, a user equipment, a mobile terminal, a PDA, a laptop computer, a handheld computer, and combinations thereof, can be operatively connected to the cellular network 502. The cellular network 502 can be configured as a 2G GSM network and can provide data communications via GPRS and/or EDGE. Additionally, or alternatively, the cellular network 502 can be configured as a 3G UMTS network and can provide data communications via the HSPA protocol family, for example, HSDPA, EUL (also referred to as HSDPA), and HSPA+. The cellular network 502 also is compatible with 4G mobile communications standards as well as evolved and future mobile standards.

The packet data network 504 includes various devices, for example, servers, computers, databases, and other devices in communication with one another, as is generally known. The packet data network 504 devices are accessible via one or more network links. The servers often store various files that are provided to a requesting device such as, for example, a computer, a terminal, a smartphone, or the like. Typically, the requesting device includes software (a "browser") for executing a web page in a format readable by the browser or other software. Other files and/or data may be accessible via "links" in the retrieved files, as is generally known. In some embodiments, the packet data network 504 includes or is in communication with the Internet. The circuit switched network 506 includes various hardware and software for providing circuit switched communications. The circuit switched network 506 may include, or may be, what is often referred to as a plain old telephone system (POTS). The functionality of a circuit switched network 506 or other circuit-switched network are generally known and will not be described herein in detail.

The illustrated cellular network 502 is shown in communication with the packet data network 504 and a circuit switched network 506, though it should be appreciated that this is not necessarily the case. One or more Internet-capable devices 510, for example, a PC, a laptop, a portable device, or another suitable device, can communicate with one or more cellular networks 502, and devices connected thereto, through the packet data network 504. It also should be appreciated that the Internet-capable device 510 can communicate with the packet data network 504 through the circuit switched network 506, the cellular network 502, and/or via other networks (not illustrated).

As illustrated, a communications device 512, for example, a telephone, facsimile machine, modem, computer, or the like, can be in communication with the circuit switched network 506, and therethrough to the packet data network 504 and/or the cellular network 502. It should be appreciated that the communications device 512 can be an Internet-capable device, and can be substantially similar to the Internet-capable device 510. In the specification, the network 104 is used to refer broadly to any combination of the networks 502, 504, 506. It should be appreciated that substantially all of the functionality described with reference to the network 104 can be performed by the cellular network 502, the packet data network 504, and/or the circuit switched network 506, alone or in combination with other networks, network elements, and the like.

Figure 6:
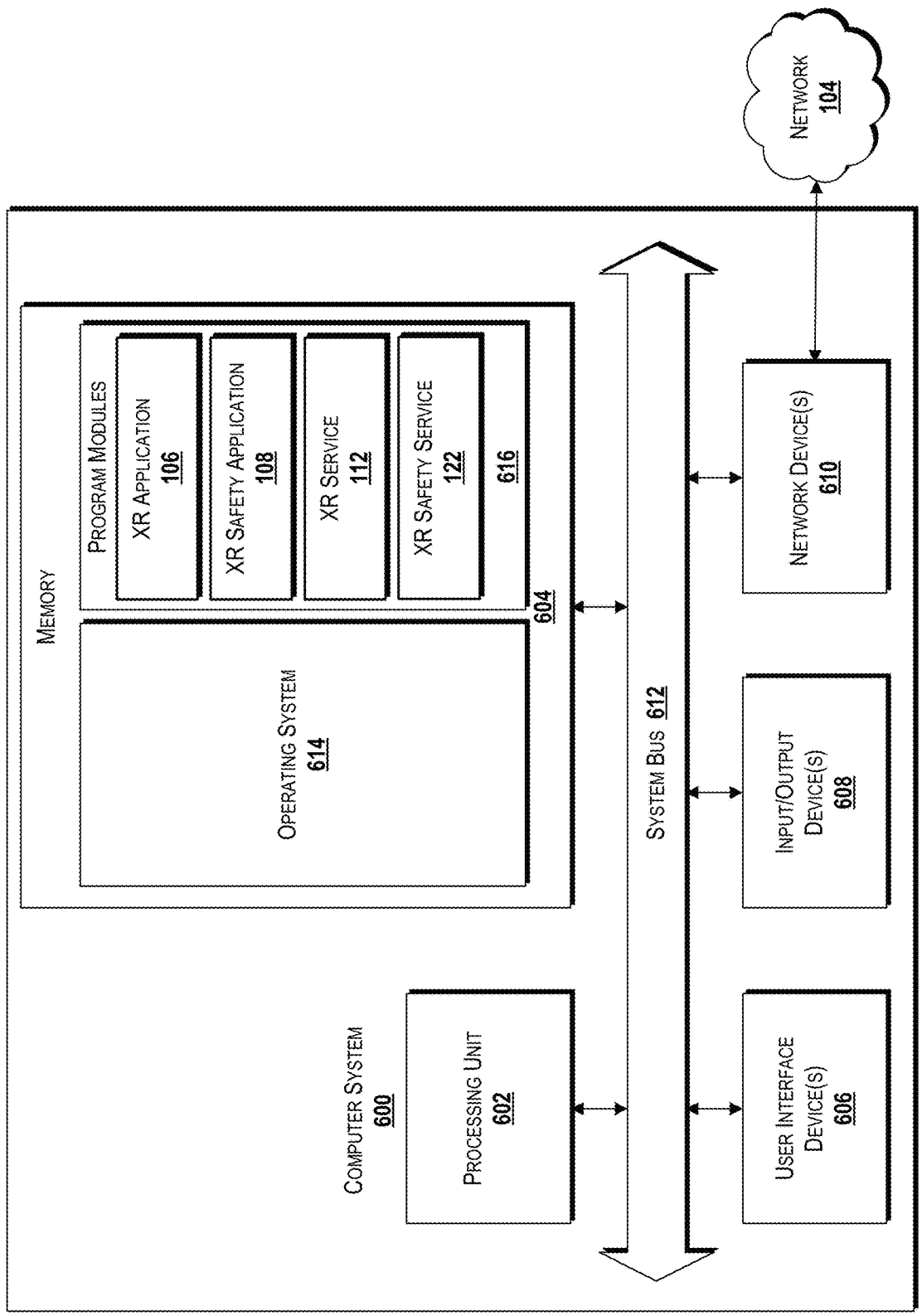
FIG. 6 is a block diagram illustrating an example computer system configured to provide a cross-reality safety service, according to some illustrative embodiments of the concepts and technologies described herein.

FIG. 6 is a block diagram illustrating a computer system 600 configured to provide the functionality described herein for a cross-reality safety service 122, in accordance with various embodiments of the concepts and technologies disclosed herein. The computer system 600 includes a processing unit 602, a memory 604, one or more user interface devices 606, one or more input/output ("I/O") devices 608, and one or more network devices 610, each of which is operatively connected to a system bus 612. The bus 612 enables bi-directional communication between the processing unit 602, the memory 604, the user interface devices 606, the I/O devices 608, and the network devices 610.

The processing unit 602 may be a standard central processor that performs arithmetic and logical operations, a more specific purpose programmable logic controller ("PLC"), a programmable gate array, or other type of processor known to those skilled in the art and suitable for controlling the operation of the server computer. As used herein, the word "processor" and/or the phrase "processing unit" when used with regard to any architecture or system can include multiple processors or processing units distributed across and/or operating in parallel in a single machine or in multiple machines. Furthermore, processors and/or processing units can be used to support virtual processing environments. Processors and processing units also can include state machines, application-specific integrated circuits ("ASICs"), combinations thereof, or the like. Because processors and/or processing units are generally known, the processors and processing units disclosed herein will not be described in further detail herein.

The memory 604 communicates with the processing unit 602 via the system bus 612. In some embodiments, the memory 604 is operatively connected to a memory controller (not shown) that enables communication with the processing unit 602 via the system bus 612. The memory 604 includes an operating system 614 and one or more program modules 616. The operating system 614 can include, but is not limited to, members of the WINDOWS, WINDOWS CE, and/or WINDOWS MOBILE families of operating systems from MICROSOFT CORPORATION, the LINUX family of operating systems, the SYMBIAN family of operating systems from SYMBIAN LIMITED, the BREW family of operating systems from QUALCOMM CORPORATION, the MAC OS, iOS, and/or LEOPARD families of operating systems from APPLE CORPORATION, the FREEBSD family of operating systems, the SOLARIS family of operating systems from ORACLE CORPORATION, other operating systems, and the like.

The program modules 616 may include various software and/or program modules described herein. In some embodiments, for example, the program modules 616 include the cross-reality application 106, the cross-reality safety application 108, the cross-reality service 112, and/or the cross-reality safety service 122. These and/or other programs can be embodied in computer-readable media containing instructions that, when executed by the processing unit 602, perform one or more of the methods 300 and 400 described in detail above with respect to FIGS. 3-4 and/or other functionality as illustrated and described herein. It can be appreciated that, at least by virtue of the instructions embodying the methods 300 and 400, and/or other functionality illustrated and described herein being stored in the memory 604 and/or accessed and/or executed by the processing unit 602, the computer system 600 is a special-purpose computing system that can facilitate providing the functionality illustrated and described herein. According to embodiments, the program modules 616 may be embodied in hardware, software, firmware, or any combination thereof. Although not shown in FIG. 6, it should be understood that the memory 604 also can be configured to store the cross-reality environment data 110, the rendered environment 118, the cross-reality rendered environment data 126, the sensor data 130, the request data 132, the profiles 134, the updates 136, the alerts 138, and/or other data, if desired.

By way of example, and not limitation, computer-readable media may include any available computer storage media or communication media that can be accessed by the computer system 600. Communication media includes computer-readable instructions, data structures, program modules, or other data in a modulated data signal such as a carrier wave or other transport mechanism and includes any delivery media. The term "modulated data signal" means a signal that has one or more of its characteristics changed or set in a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

Computer storage media includes only non-transitory embodiments of computer readable media as illustrated and described herein. Thus, computer storage media can include volatile and non-volatile, removable and non-removable media implemented in any method or technology for storage of information such as computer-readable instructions, data structures, program modules, or other data. Computer storage media includes, but is not limited to, RAM, ROM, Erasable Programmable ROM ("EPROM"), Electrically Erasable Programmable ROM ("EEPROM"), flash memory or other solid state memory technology, CD-ROM, digital versatile disks ("DVD"), or other optical storage, magnetic cassettes, magnetic tape, magnetic disk storage or other magnetic storage devices, or any other medium which can be used to store the desired information and which can be accessed by the computer system 600. In the claims, the phrase "computer storage medium" and variations thereof does not include waves or signals per se and/or communication media.

The user interface devices 606 may include one or more devices with which a user accesses the computer system 600. The user interface devices 606 may include, but are not limited to, computers, servers, personal digital assistants, cellular phones, or any suitable computing devices. The I/O devices 608 enable a user to interface with the program modules 616. In one embodiment, the I/O devices 608 are operatively connected to an I/O controller (not shown) that enables communication with the processing unit 602 via the system bus 612. The I/O devices 608 may include one or more input devices, such as, but not limited to, a keyboard, a mouse, or an electronic stylus. Further, the I/O devices 608 may include one or more output devices, such as, but not limited to, a display screen or a printer.

The network devices 610 enable the computer system 600 to communicate with other networks or remote systems via a network, such as the network 104. Examples of the network devices 610 include, but are not limited to, a modem, a radio frequency ("RF") or infrared ("IR") transceiver, a telephonic interface, a bridge, a router, or a network card. The network 104 may include a wireless network such as, but not limited to, a Wireless Local Area Network ("WLAN") such as a WI-FI network, a Wireless Wide Area Network ("WWAN"), a Wireless Personal Area Network ("WPAN") such as BLUETOOTH, a Wireless Metropolitan Area Network ("WMAN") such a WiMAX network, or a cellular network. Alternatively, the network 104 may be a wired network such as, but not limited to, a Wide Area Network ("WAN") such as the Internet, a Local Area Network ("LAN") such as the Ethernet, a wired Personal Area Network ("PAN"), or a wired Metropolitan Area Network ("MAN").

Figure 7:
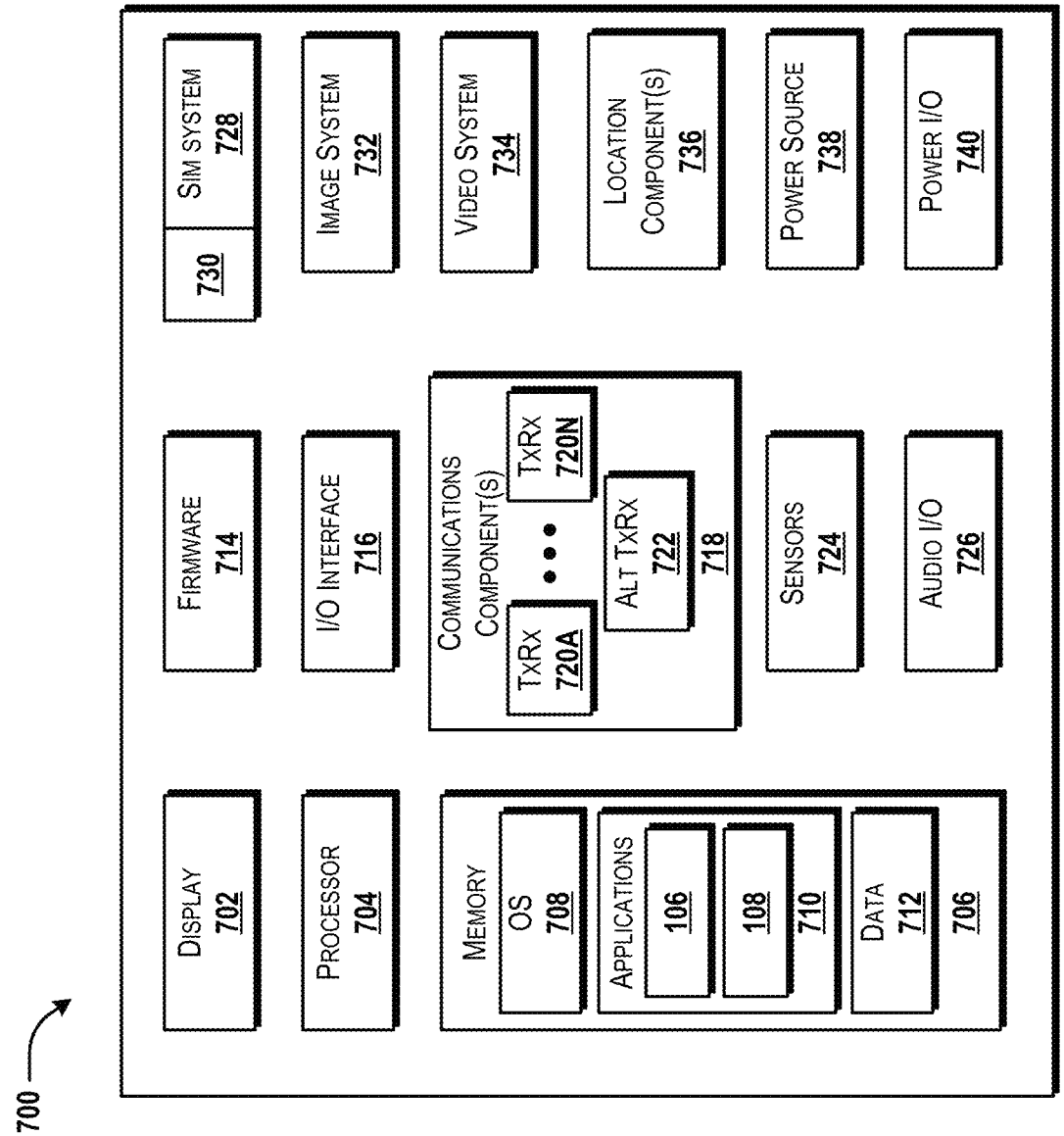
FIG. 7 is a block diagram illustrating an example mobile device configured to interact with a cross-reality safety service, according to some illustrative embodiments of the concepts and technologies described herein.

Turning now to FIG. 7, an illustrative mobile device 700 and components thereof will be described. In some embodiments, the user device 102 described above with reference to FIGS. 1-4 can be configured as and/or can have an architecture similar or identical to the mobile device 700 described herein in FIG. 7. It should be understood, however, that the user device 102 may or may not include the functionality described herein with reference to FIG. 7. While connections are not shown between the various components illustrated in FIG. 7, it should be understood that some, none, or all of the components illustrated in FIG. 7 can be configured to interact with one another to carry out various device functions. In some embodiments, the components are arranged so as to communicate via one or more busses (not shown). Thus, it should be understood that FIG. 7 and the following description are intended to provide a general understanding of a suitable environment in which various aspects of embodiments can be implemented, and should not be construed as being limiting in any way.

As illustrated in FIG. 7, the mobile device 700 can include a display 702 for displaying data. According to various embodiments, the display 702 can be configured to display various graphical user interface ("GUI") elements such as, for example, a settings page for creating a profile 134; a cross-reality session request page; a user interface for creating safe words, safe phrases, and/or safe actions; a user interface for presenting a notification such as the alert 138; text; images; video; virtual keypads and/or keyboards; messaging data; notification messages; metadata; internet content; device status; time; date; calendar data; device preferences; map and location data; combinations thereof; and/or the like. The mobile device 700 also can include a processor 704 and a memory or other data storage device ("memory") 706. The processor 704 can be configured to process data and/or can execute computer-executable instructions stored in the memory 706. The computer-executable instructions executed by the processor 704 can include, for example, an operating system 708, one or more applications 710 such as the cross-reality application 106, the cross-reality safety application 108, other computer-executable instructions stored in a memory 706, or the like. In some embodiments, the applications 710 also can include a UI application (not illustrated in FIG. 7).

The UI application can interface with the operating system 708 to facilitate user interaction with functionality and/or data stored at the mobile device 700 and/or stored elsewhere. In some embodiments, the operating system 708 can include a member of the SYMBIAN OS family of operating systems from SYMBIAN LIMITED, a member of the WINDOWS MOBILE OS and/or WINDOWS PHONE OS families of operating systems from MICROSOFT CORPORATION, a member of the PALM WEBOS family of operating systems from HEWLETT PACKARD CORPORATION, a member of the BLACKBERRY OS family of operating systems from RESEARCH IN MOTION LIMITED, a member of the IOS family of operating systems from APPLE INC., a member of the ANDROID OS family of operating systems from GOOGLE INC., and/or other operating systems. These operating systems are merely illustrative of some contemplated operating systems that may be used in accordance with various embodiments of the concepts and technologies described herein and therefore should not be construed as being limiting in any way.

The UI application can be executed by the processor 704 to aid a user in entering content, creating profiles 134, creating cross-reality sessions, viewing and/or acting on updates 136 and/or alerts 138, configuring settings, manipulating address book content and/or settings, multimode interaction, interacting with other applications 710, and otherwise facilitating user interaction with the operating system 708, the applications 710, and/or other types or instances of data 712 that can be stored at the mobile device 700. The data 712 can include, for example, the cross-reality environment data 110, the cross-reality rendered environment data 126, the sensor data 130, the updates 136, the alerts 138, the request data 132, and/or other applications or program modules. According to various embodiments, the data 712 can include, for example, presence applications, visual voice mail applications, messaging applications, text-to-speech and speech-to-text applications, add-ons, plug-ins, email applications, music applications, video applications, camera applications, location-based service applications, power conservation applications, game applications, productivity applications, entertainment applications, enterprise applications, combinations thereof, and the like. The applications 710, the data 712, and/or portions thereof can be stored in the memory 706 and/or in a firmware 714, and can be executed by the processor 704.

It can be appreciated that, at least by virtue of storage of the instructions corresponding to the applications 710 and/or other instructions embodying other functionality illustrated and described herein in the memory 706, and/or by virtue of the instructions corresponding to the applications 710 and/or other instructions embodying other functionality illustrated and described herein being accessed and/or executed by the processor 704, the mobile device 700 is a special-purpose mobile device that can facilitate providing the functionality illustrated and described herein. The firmware 714 also can store code for execution during device power up and power down operations. It can be appreciated that the firmware 714 can be stored in a volatile or non-volatile data storage device including, but not limited to, the memory 706 and/or a portion thereof.

The mobile device 700 also can include an input/output ("I/O") interface 716. The I/O interface 716 can be configured to support the input/output of data such as location information, user information, organization information, presence status information, user IDs, passwords, and application initiation (start-up) requests. In some embodiments, the I/O interface 716 can include a hardwire connection such as a universal serial bus ("USB") port, a mini-USB port, a micro-USB port, an audio jack, a PS2 port, an IEEE 1394 ("FIREWIRE") port, a serial port, a parallel port, an Ethernet (RJ45 or RJ48) port, a telephone (RJ11 or the like) port, a proprietary port, combinations thereof, or the like. In some embodiments, the mobile device 700 can be configured to synchronize with another device to transfer content to and/or from the mobile device 700. In some embodiments, the mobile device 700 can be configured to receive updates to one or more of the applications 710 via the I/O interface 716, though this is not necessarily the case. In some embodiments, the I/O interface 716 accepts I/O devices such as keyboards, keypads, mice, interface tethers, printers, plotters, external storage, touch/multi-touch screens, touch pads, trackballs, joysticks, microphones, remote control devices, displays, projectors, medical equipment (e.g., stethoscopes, heart monitors, and other health metric monitors), modems, routers, external power sources, docking stations, combinations thereof, and the like. It should be appreciated that the I/O interface 716 may be used for communications between the mobile device 700 and a network device or local device.

The mobile device 700 also can include a communications component 718. The communications component 718 can be configured to interface with the processor 704 to facilitate wired and/or wireless communications with one or more networks such as the network 104 described herein. In some embodiments, other networks include networks that utilize non-cellular wireless technologies such as WI-FI or WIMAX. In some embodiments, the communications component 718 includes a multimode communications subsystem for facilitating communications via the cellular network and one or more other networks.

The communications component 718, in some embodiments, includes one or more transceivers. The one or more transceivers, if included, can be configured to communicate over the same and/or different wireless technology standards with respect to one another. For example, in some embodiments one or more of the transceivers of the communications component 718 may be configured to communicate using GSM, CDMAONE, CDMA2000, LTE, and various other 2G, 2.5G, 3G, 4G, and greater generation technology standards. Moreover, the communications component 718 may facilitate communications over various channel access methods (which may or may not be used by the aforementioned standards) including, but not limited to, TDMA, FDMA, W-CDMA, OFDM, SDMA, and the like.

In addition, the communications component 718 may facilitate data communications using GPRS, EDGE, the HSPA protocol family including HSDPA, EUL or otherwise termed HSDPA, HSPA+, and various other current and future wireless data access standards. In the illustrated embodiment, the communications component 718 can include a first transceiver ("TxRx") 720A that can operate in a first communications mode (e.g., GSM). The communications component 718 also can include an $N^{th}$ transceiver ("TxRx") 720N that can operate in a second communications mode relative to the first transceiver 720A (e.g., UMTS). While two transceivers 720A-N (hereinafter collectively and/or generically referred to as "transceivers 720") are shown in FIG. 7, it should be appreciated that less than two, two, and/or more than two transceivers 720 can be included in the communications component 718.

The communications component 718 also can include an alternative transceiver ("Alt TxRx") 722 for supporting other types and/or standards of communications. According to various contemplated embodiments, the alternative transceiver 722 can communicate using various communications technologies such as, for example, WI-FI, WIMAX, BLUETOOTH, infrared, infrared data association ("IRDA"), near field communications ("NFC"), other RF technologies, combinations thereof, and the like. In some embodiments, the communications component 718 also can facilitate reception from terrestrial radio networks, digital satellite radio networks, internet-based radio service networks, combinations thereof, and the like. The communications component 718 can process data from a network such as the Internet, an intranet, a broadband network, a WI-FI hotspot, an Internet service provider ("ISP"), a digital subscriber line ("DSL") provider, a broadband provider, combinations thereof, or the like.

The mobile device 700 also can include one or more sensors 724. The sensors 724 can include temperature sensors, light sensors, air quality sensors, movement sensors, orientation sensors, noise sensors, proximity sensors, or the like. As such, it should be understood that the sensors 724 can include, but are not limited to, accelerometers, magnetometers, gyroscopes, infrared sensors, noise sensors, microphones, combinations thereof, or the like. Additionally, audio capabilities for the mobile device 700 may be provided by an audio I/O component 726. The audio I/O component 726 of the mobile device 700 can include one or more speakers for the output of audio signals, one or more microphones for the collection and/or input of audio signals, and/or other audio input and/or output devices.

The illustrated mobile device 700 also can include a subscriber identity module ("SIM") system 728. The SIM system 728 can include a universal SIM ("USIM"), a universal integrated circuit card ("UICC") and/or other identity devices. The SIM system 728 can include and/or can be connected to or inserted into an interface such as a slot interface 730. In some embodiments, the slot interface 730 can be configured to accept insertion of other identity cards or modules for accessing various types of networks. Additionally, or alternatively, the slot interface 730 can be configured to accept multiple subscriber identity cards. Because other devices and/or modules for identifying users and/or the mobile device 700 are contemplated, it should be understood that these embodiments are illustrative, and should not be construed as being limiting in any way.

The mobile device 700 also can include an image capture and processing system 732 ("image system"). The image system 732 can be configured to capture or otherwise obtain photos, videos, and/or other visual information. As such, the image system 732 can include cameras, lenses, charge-coupled devices ("CCDs"), combinations thereof, or the like. The mobile device 700 may also include a video system 734. The video system 734 can be configured to capture, process, record, modify, and/or store video content. Photos and videos obtained using the image system 732 and the video system 734, respectively, may be added as message content to an MMS message, email message, and sent to another mobile device. The video and/or photo content also can be shared with other devices via various types of data transfers via wired and/or wireless communication devices as described herein.

The mobile device 700 also can include one or more location components 736. The location components 736 can be configured to send and/or receive signals to determine a geographic location of the mobile device 700. According to various embodiments, the location components 736 can send and/or receive signals from global positioning system ("GPS") devices, assisted-GPS ("A-GPS") devices, WI-FI/WIMAX and/or cellular network triangulation data, combinations thereof, and the like. The location component 736 also can be configured to communicate with the communications component 718 to retrieve triangulation data for determining a location of the mobile device 700. In some embodiments, the location component 736 can interface with cellular network nodes, telephone lines, satellites, location transmitters and/or beacons, wireless network transmitters and receivers, combinations thereof, and the like. In some embodiments, the location component 736 can include and/or can communicate with one or more of the sensors 724 such as a compass, an accelerometer, and/or a gyroscope to determine the orientation of the mobile device 700. Using the location component 736, the mobile device 700 can generate and/or receive data to identify its geographic location, or to transmit data used by other devices to determine the location of the mobile device 700. The location component 736 may include multiple components for determining the location and/or orientation of the mobile device 700.

The illustrated mobile device 700 also can include a power source 738. The power source 738 can include one or more batteries, power supplies, power cells, and/or other power subsystems including alternating current ("AC") and/or direct current ("DC") power devices. The power source 738 also can interface with an external power system or charging equipment via a power I/O component 740. Because the mobile device 700 can include additional and/or alternative components, the above embodiment should be understood as being illustrative of one possible operating environment for various embodiments of the concepts and technologies described herein. The described embodiment of the mobile device 700 is illustrative, and should not be construed as being limiting in any way.

Figure 8:
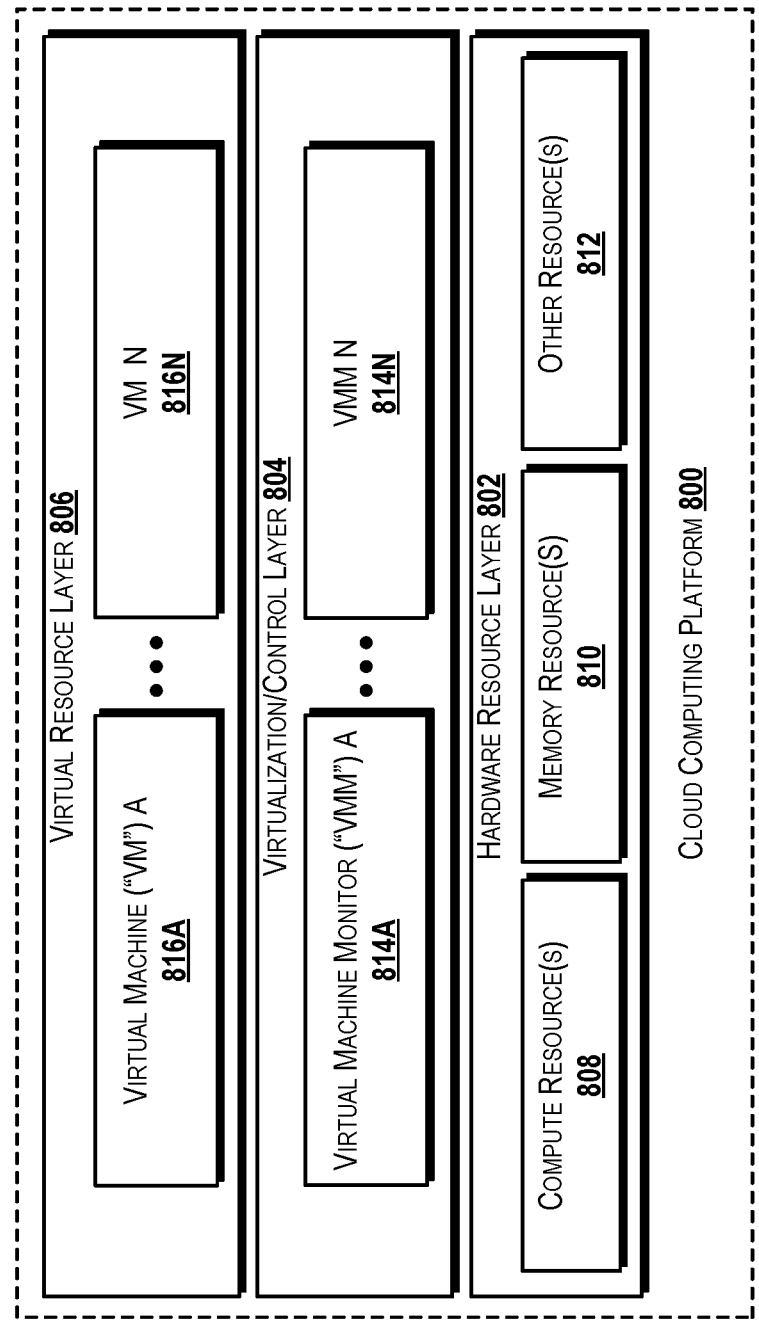
FIG. 8 is a diagram illustrating a cloud computing platform capable of implementing aspects of the concepts and technologies disclosed herein, according to some illustrative embodiments of the concepts and technologies described herein.

FIG. 8 illustrates an illustrative architecture for a cloud computing platform 800 that can be capable of executing the software components described herein for providing a cross-reality safety service 122 and/or for interacting with the cross-reality application 106, cross-reality safety application 108, the cross-reality service 112, the cross-reality safety service 122, and/or other applications and/or services. Thus, it can be appreciated that in some embodiments of the concepts and technologies disclosed herein, the cloud computing platform 800 illustrated in FIG. 8 can be used to provide the functionality described herein with respect to the cross-reality service 112, the server computer 124, and/or other devices and/or entities.

The cloud computing platform 800 thus may be utilized to execute any aspects of the software components presented herein. Thus, according to various embodiments of the concepts and technologies disclosed herein, the cross-reality application 106, the cross-reality safety application 108, the cross-reality service 112, the cross-reality safety service 122, and/or other applications and/or services can be implemented, at least in part, on or by elements included in the cloud computing platform 800 illustrated and described herein. Those skilled in the art will appreciate that the illustrated cloud computing platform 800 is a simplification of but only one possible implementation of an illustrative cloud computing platform, and as such, the illustrated cloud computing platform 800 should not be construed as being limiting in any way.

In the illustrated embodiment, the cloud computing platform 800 can include a hardware resource layer 802, a virtualization/control layer 804, and a virtual resource layer 806. These layers and/or other layers can be configured to cooperate with each other and/or other elements of a cloud computing platform 800 to perform operations as will be described in detail herein. While connections are shown between some of the components illustrated in FIG. 8, it should be understood that some, none, or all of the components illustrated in FIG. 8 can be configured to interact with one another to carry out various functions described herein. In some embodiments, the components are arranged so as to communicate via one or more networks such as, for example, the network 104 illustrated and described hereinabove (not shown in FIG. 8). Thus, it should be understood that FIG. 8 and the following description are intended to provide a general understanding of a suitable environment in which various aspects of embodiments can be implemented, and should not be construed as being limiting in any way.

The hardware resource layer 802 can provide hardware resources. In the illustrated embodiment, the hardware resources can include one or more compute resources 808, one or more memory resources 810, and one or more other resources 812. The compute resource(s) 808 can include one or more hardware components that can perform computations to process data, and/or to execute computer-executable instructions of one or more application programs, operating systems, services, and/or other software including, but not limited to, the cross-reality application 106, the cross-reality safety application 108, the cross-reality service 112, the cross-reality safety service 122, and/or other applications and/or services illustrated and described herein.

According to various embodiments, the compute resources 808 can include one or more central processing units ("CPUs"). The CPUs can be configured with one or more processing cores. In some embodiments, the compute resources 808 can include one or more graphics processing units ("GPUs"). The GPUs can be configured to accelerate operations performed by one or more CPUs, and/or to perform computations to process data, and/or to execute computer-executable instructions of one or more application programs, operating systems, and/or other software that may or may not include instructions that are specifically graphics computations and/or related to graphics computations. In some embodiments, the compute resources 808 can include one or more discrete GPUs. In some other embodiments, the compute resources 808 can include one or more CPU and/or GPU components that can be configured in accordance with a co-processing CPU/GPU computing model. Thus, it can be appreciated that in some embodiments of the compute resources 808, a sequential part of an application can execute on a CPU and a computationally-intensive part of the application can be accelerated by the GPU. It should be understood that this example is illustrative, and therefore should not be construed as being limiting in any way.

In some embodiments, the compute resources 808 also can include one or more system on a chip ("SoC") components. It should be understood that the SoC component can operate in association with one or more other components as illustrated and described herein, for example, one or more of the memory resources 810 and/or one or more of the other resources 812. In some embodiments in which an SoC component is included, the compute resources 808 can be or can include one or more embodiments of the SNAPDRAGON brand family of SoCs, available from QUALCOMM of San Diego, Calif.; one or more embodiment of the TEGRA brand family of SoCs, available from NVIDIA of Santa Clara, Calif.; one or more embodiment of the HUMMINGBIRD brand family of SoCs, available from SAMSUNG of Seoul, South Korea; one or more embodiment of the Open Multimedia Application Platform ("OMAP") family of SoCs, available from TEXAS INSTRUMENTS of Dallas, Tex.; one or more customized versions of any of the above SoCs; and/or one or more other brand and/or one or more proprietary SoCs.

The compute resources 808 can be or can include one or more hardware components arranged in accordance with an ARM architecture, available for license from ARM HOLDINGS of Cambridge, United Kingdom. Alternatively, the compute resources 808 can be or can include one or more hardware components arranged in accordance with an x86 architecture, such as an architecture available from INTEL CORPORATION of Mountain View, Calif., and others. Those skilled in the art will appreciate the implementation of the compute resources 808 can utilize various computation architectures and/or processing architectures. As such, the various example embodiments of the compute resources 808 as mentioned hereinabove should not be construed as being limiting in any way. Rather, implementations of embodiments of the concepts and technologies disclosed herein can be implemented using compute resources 808 having any of the particular computation architecture and/or combination of computation architectures mentioned herein as well as other architectures.

Although not separately illustrated in FIG. 8, it should be understood that the compute resources 808 illustrated and described herein can host and/or execute various services, applications, portals, and/or other functionality illustrated and described herein. Thus, the compute resources 808 can host and/or can execute the cross-reality application 106, the cross-reality safety application 108, the cross-reality service 112, the cross-reality safety service 122, or other applications or services illustrated and described herein.

The memory resource(s) 810 can include one or more hardware components that can perform or provide storage operations, including temporary and/or permanent storage operations. In some embodiments, the memory resource(s) 810 can include volatile and/or non-volatile memory implemented in any method or technology for storage of information such as computer-readable instructions, data structures, program modules, or other data disclosed herein. Computer storage media is defined hereinabove and therefore should be understood as including, in various embodiments, random access memory ("RAM"), read-only memory ("ROM"), Erasable Programmable ROM ("EPROM"), Electrically Erasable Programmable ROM ("EEPROM"), flash memory or other solid state memory technology, CD-ROM, digital versatile disks ("DVD"), or other optical storage, magnetic cassettes, magnetic tape, magnetic disk storage or other magnetic storage devices, or any other medium that can be used to store data and that can be accessed by the compute resources 808, subject to the definition of "computer storage media" provided above (e.g., as excluding waves and signals per se and/or communication media as defined in this application).

Although not illustrated in FIG. 8, it should be understood that the memory resources 810 can host or store the various data illustrated and described herein including, but not limited to, the cross-reality environment data 110, the rendered environment 118, the cross-reality rendered environment data 126, the sensor data 130, the request data 132, the profiles 134, the updates 136, and alerts 138, and/or other data, if desired. It should be understood that this example is illustrative, and therefore should not be construed as being limiting in any way.

The other resource(s) 812 can include any other hardware resources that can be utilized by the compute resources(s) 808 and/or the memory resource(s) 810 to perform operations. The other resource(s) 812 can include one or more input and/or output processors (e.g., a network interface controller and/or a wireless radio), one or more modems, one or more codec chipsets, one or more pipeline processors, one or more fast Fourier transform ("FFT") processors, one or more digital signal processors ("DSPs"), one or more speech synthesizers, combinations thereof, or the like.

The hardware resources operating within the hardware resource layer 802 can be virtualized by one or more virtual machine monitors ("VMMs") 814A-814N (also known as "hypervisors;" hereinafter "VMMs 814"). The VMMs 814 can operate within the virtualization/control layer 804 to manage one or more virtual resources that can reside in the virtual resource layer 806. The VMMs 814 can be or can include software, firmware, and/or hardware that alone or in combination with other software, firmware, and/or hardware, can manage one or more virtual resources operating within the virtual resource layer 806.

The virtual resources operating within the virtual resource layer 806 can include abstractions of at least a portion of the compute resources 808, the memory resources 810, the other resources 812, or any combination thereof. These abstractions are referred to herein as virtual machines ("VMs"). In the illustrated embodiment, the virtual resource layer 806 includes VMs 816A-816N (hereinafter "VMs 816").

Based on the foregoing, it should be appreciated that systems and methods for providing and/or interacting with a cross-reality safety service have been disclosed herein. Although the subject matter presented herein has been described in language specific to computer structural features, methodological and transformative acts, specific computing machinery, and computer-readable media, it is to be understood that the concepts and technologies disclosed herein are not necessarily limited to the specific features, acts, or media described herein. Rather, the specific features, acts and mediums are disclosed as example forms of implementing the concepts and technologies disclosed herein.

The subject matter described above is provided by way of illustration only and should not be construed as limiting. Various modifications and changes may be made to the subject matter described herein without following the example embodiments and applications illustrated and described, and without departing from the true spirit and scope of the embodiments of the concepts and technologies disclosed herein.

The invention claimed is:

1. A system comprising:
   a processor; and
   a memory that stores computer-executable instructions that, when executed by the processor, cause the processor to perform operations comprising
      detecting a cross-reality session associated with a user device, wherein the cross-reality session comprises a rendered environment displayed by cross-reality equipment in communication with the user device, and wherein the user device and the cross-reality equipment are located in a physical environment,
      obtaining, from the cross-reality equipment, data associated with the cross-reality session,
      determining, based on the data, if a safety issue exists for the cross-reality session, and
      in response to determining that the safety issue exists for the cross-reality session, sending, directed to the user device, a communication, wherein the communication comprises an update that, when received by the user device, causes the user device to update the rendered environment associated with the cross-reality session to remove the safety issue from the rendered environment, and to send an updated rendered environment to the cross-reality equipment.

2. The system of claim 1, wherein the cross-reality equipment comprises a sensor at the cross-reality equipment, wherein the data comprises cross-reality rendered environment data that represents the rendered environment, wherein the data further comprises sensor data obtained from the sensor, wherein the sensor data represents a condition in the physical environment, and wherein determining that the safety issue exists comprises:
   analyzing the sensor data to identify the condition in the physical environment; and
   determining that the condition poses a risk to a user engaged in the cross-reality session.

3. The system of claim 2, wherein the risk comprises a mismatch between a virtual texture associated with a rendered object in the rendered environment and a real texture associated with a real object in the physical environment.

4. The system of claim 1, wherein the communication comprises a command to end the cross-reality session, and wherein updating the rendered environment and sending the updated rendered environment comprise ending the cross-reality session.

5. The system of claim 1, wherein the data comprises cross-reality rendered environment data that represents the rendered environment and request data that defines a requested cross-reality session, wherein the safety issue comprises a mismatch between the rendered environment and the requested cross-reality session, and wherein the mismatch corresponds to an unexpected experience rendered in the rendered environment, wherein the unexpected experience differs from the requested cross-reality session.

6. A method comprising:
   detecting, at a device comprising a processor, a cross-reality session associated with a user device, wherein the cross-reality session comprises a rendered environment displayed by cross-reality equipment in communication with the user device, and wherein the user device and the cross-reality equipment are located in a physical environment;
   obtaining, by the device and from the cross-reality equipment, data associated with the cross-reality session;
   determining, by the device and based on the data, if a safety issue exists for the cross-reality session; and
   in response to determining that the safety issue exists for the cross-reality session, sending, by the device and directed to the user device, a communication, wherein the communication comprises an update that, when received by the user device, causes the user device to update the rendered environment associated with the cross-reality session to remove the safety issue from the rendered environment, and to send an updated rendered environment to the cross-reality equipment.

7. The method of claim 6, wherein the data comprises cross-reality rendered environment data that represents the rendered environment and sensor data that is obtained from a sensor at the cross-reality equipment, and wherein the sensor data represents a condition in the physical environment in which the user device and the cross-reality equipment are located.

8. The method of claim 7, wherein determining that the safety issue exists comprises:
   analyzing the sensor data to identify the condition in the physical environment; and
   determining that the condition poses a risk to a user engaged in the cross-reality session.

9. The method of claim 8, wherein the risk comprises a mismatch between a virtual texture associated with a rendered object in the rendered environment and a real texture associated with a real object in the physical environment.

10. The method of claim 6, wherein the communication further comprises an alert indicating that the safety issue exists, wherein the alert is rendered by the user device and presented by the cross-reality equipment.

11. The method of claim 6, wherein the communication comprises a command to end the cross-reality session, and wherein updating the rendered environment and sending the updated rendered environment comprise ending the cross-reality session.

12. The method of claim 6, wherein the data comprises cross-reality rendered environment data that represents the rendered environment and request data that defines a requested cross-reality session.

13. The method of claim 12, wherein the safety issue comprises a mismatch between the rendered environment and the requested cross-reality session, and wherein the mismatch corresponds to an insertion of an unexpected experience rendered in the rendered environment, wherein the unexpected experience differs from the requested cross-reality session.

14. The method of claim 12, wherein the request data is obtained from a cross-reality service that generates cross-reality environment data that is provided, by the cross-reality service, to the user device to render the rendered environment.

15. The method of claim 6, wherein the data comprises a profile associated with the user device, and wherein the profile defines a threshold that represents a comfort of a user associated with the user device.

16. A computer storage medium having computer-executable instructions stored thereon that, when executed by a processor, cause the processor to perform operations comprising:
- detecting a cross-reality session associated with a user device, wherein the cross-reality session comprises a rendered environment displayed by cross-reality equipment in communication with the user device, and wherein the user device and the cross-reality equipment are located in a physical environment;
- obtaining, from the cross-reality equipment, data associated with the cross-reality session;
- determining, based on the data, if a safety issue exists for the cross-reality session; and
- in response to determining that the safety issue exists for the cross-reality session, sending, directed to the user device, a communication, wherein the communication comprises an update that, when received by the user device, causes the user device to update the rendered environment associated with the cross-reality session to remove the safety issue from the rendered environment, and to send an updated rendered environment to the cross-reality equipment.

17. The computer storage medium of claim 16, wherein the data comprises cross-reality rendered environment data that represents the rendered environment and sensor data that is obtained from a sensor at the cross-reality equipment, and wherein the sensor data represents a condition in the physical environment in which the user device and the cross-reality equipment are located.

18. The computer storage medium of claim 17, wherein determining that the safety issue exists comprises:
- analyzing the sensor data to identify a real texture associated with a real object in the physical environment; and
- determining that the condition poses a risk to a user engaged in the cross-reality session, wherein the condition comprises a mismatch between a virtual texture associated with a rendered object in the rendered environment and the real texture.

19. The computer storage medium of claim 16, wherein the communication comprises a command to end the cross-reality session, and wherein updating the rendered environment and sending the updated rendered environment comprise ending the cross-reality session.

20. The computer storage medium of claim 16, wherein the data comprises cross-reality rendered environment data that represents the rendered environment and request data that defines a requested cross-reality session, wherein the safety issue comprises a mismatch between the rendered environment and the requested cross-reality session, and wherein the mismatch corresponds to an unexpected experience rendered in the rendered environment, wherein the unexpected experience differs from the requested cross-reality session.

* * * * *